(12) United States Patent
Knodel et al.

(10) Patent No.: US 10,638,766 B2
(45) Date of Patent: May 5, 2020

(54) APPARATUSES AND METHODS OF ORIENTING SAUSAGES (NATURAL CASING SORTER)

(71) Applicant: VEMAG Maschinenbau GmbH, Verden/Aller (DE)

(72) Inventors: Peter Knodel, Oyten (DE); Christoph Thelen, Heidenau (DE); Thorsten Meininger, Verden (DE)

(73) Assignee: VEMAG MASCHINENBAU GMBH, Verden/Aller (DE)

( * ) Notice: Subject to any disclaimer, the term of this patent is extended or adjusted under 35 U.S.C. 154(b) by 245 days.

(21) Appl. No.: 15/668,057

(22) Filed: Aug. 3, 2017

(65) Prior Publication Data

US 2018/0042248 A1 Feb. 15, 2018

(30) Foreign Application Priority Data

Aug. 9, 2016 (DE) .................. 10 2016 114 731

(51) Int. Cl.
*A22C 13/00* (2006.01)
*A22C 11/00* (2006.01)
*A22C 7/00* (2006.01)

(52) U.S. Cl.
CPC .......... *A22C 13/0003* (2013.01); *A22C 7/00* (2013.01); *A22C 11/008* (2013.01); *A22C 11/00* (2013.01); *A22C 13/00* (2013.01); *A22C 2013/0023* (2013.01)

(58) Field of Classification Search
CPC .............................. A22C 13/00; A22C 13/0003
USPC ........... 452/21–26, 30–32, 35–37, 46–48, 51
See application file for complete search history.

(56) References Cited

U.S. PATENT DOCUMENTS

| 4,979,267 | A | * | 12/1990 | Burger | A22C 11/00 |
| | | | | | 206/821 |
| 5,057,055 | A | * | 10/1991 | Michaud | A22C 11/008 |
| | | | | | 452/182 |
| 5,102,368 | A | | 4/1992 | Strasser et al. | |
| 5,183,433 | A | * | 2/1993 | Townsend | A22C 15/001 |
| | | | | | 452/51 |
| 9,470,513 | B2 | | 10/2016 | Fischer | |

(Continued)

FOREIGN PATENT DOCUMENTS

| DE | 3731051 A1 | 3/1989 |
| DE | 4007803 A1 | 9/1991 |

(Continued)

OTHER PUBLICATIONS

German Patent and Trade Mark Office, Official Action issued in Application No. 10 2016 114 731.1 dated Jan. 9, 2017.

(Continued)

*Primary Examiner* — Richard T Price, Jr.
(74) *Attorney, Agent, or Firm* — Thompson Hine LLP

(57) ABSTRACT

Apparatus for orient sausages and methods of orienting sausages. The apparatus has at least one conveyor device with a moveable, in particular circulating, conveyor element on which individual sausages can be placed and transported in a conveyor direction along a path of movement. Two orientation devices are spaced from each other transversely relative to the conveyor direction and which are arranged above the moveable conveyor element, and each having at least one respective guide for laterally guiding the sausages.

31 Claims, 19 Drawing Sheets

(56) References Cited

U.S. PATENT DOCUMENTS

| | | |
|---|---|---|
| 9,554,581 B2 | 1/2017 | Willburger et al. |
| 2002/0115401 A1 | 8/2002 | Kobussen et al. |
| 2014/0106654 A1* | 4/2014 | Meggelaars ........... A22C 11/00 |
| | | 452/51 |
| 2016/0143300 A1* | 5/2016 | Willburger ......... A22C 17/0093 |
| | | 452/51 |

FOREIGN PATENT DOCUMENTS

| | | |
|---|---|---|
| EP | 2801258 B1 | 11/2014 |
| EP | 3053443 A1 | 8/2016 |
| WO | 2012144890 A1 | 10/2012 |

OTHER PUBLICATIONS

German Patent and Trade Mark Office, Official Action issued in Application No. 10 2016 114 731.1 dated Apr. 25, 2017.
European Patent Office, Extended European Search report dated Oct. 2, 2017 issued in European patent application EP 17 18 4953.2.

* cited by examiner

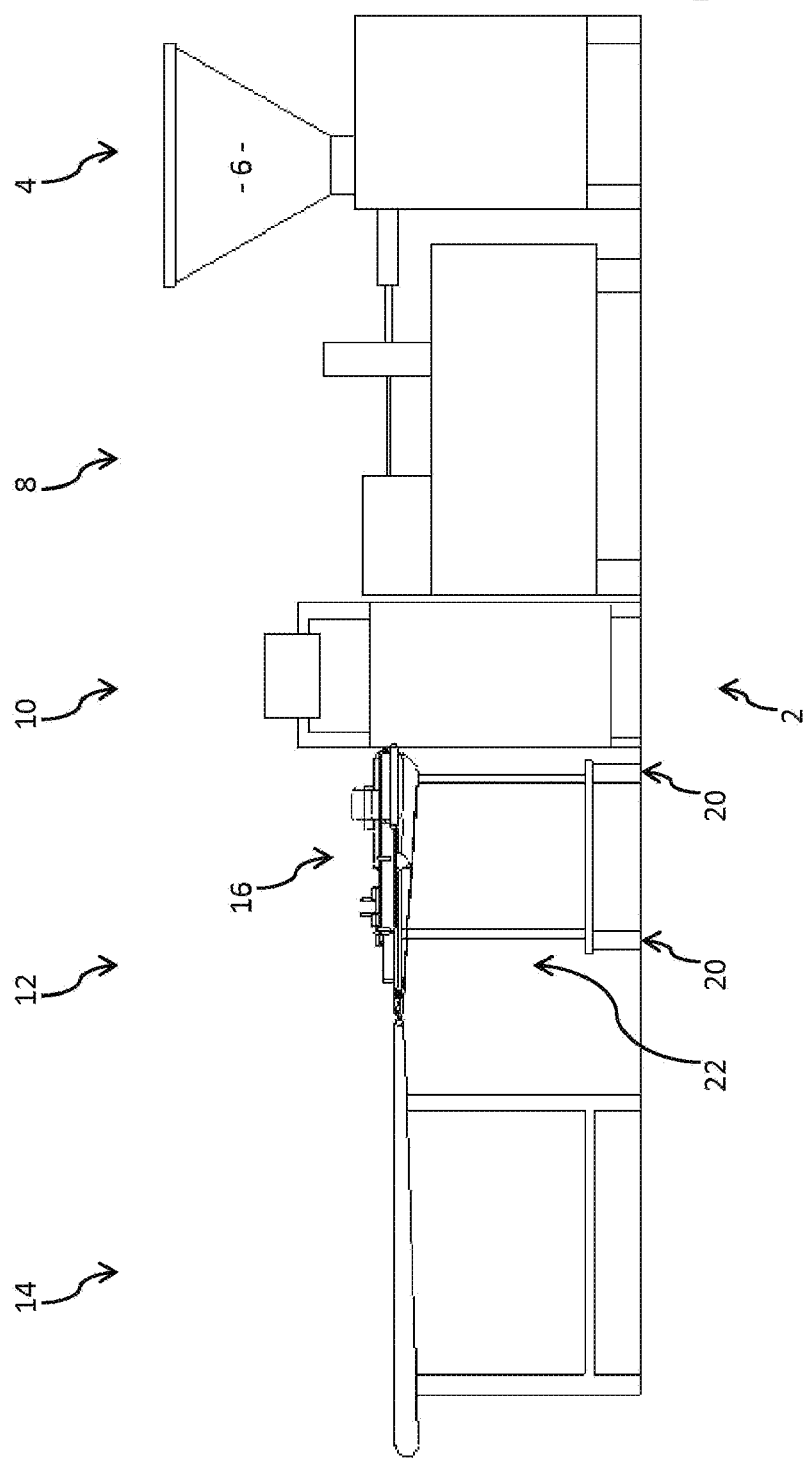

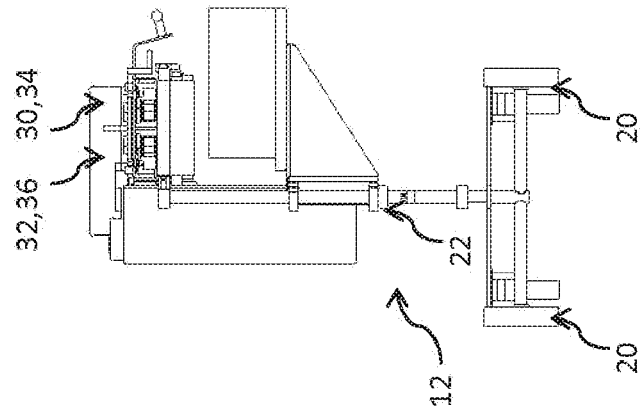
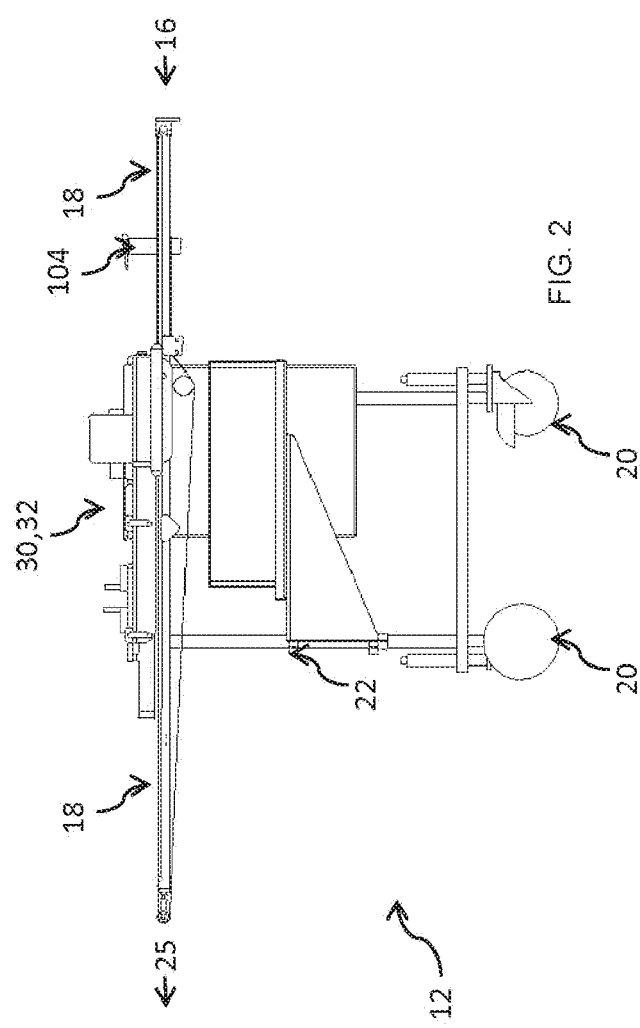
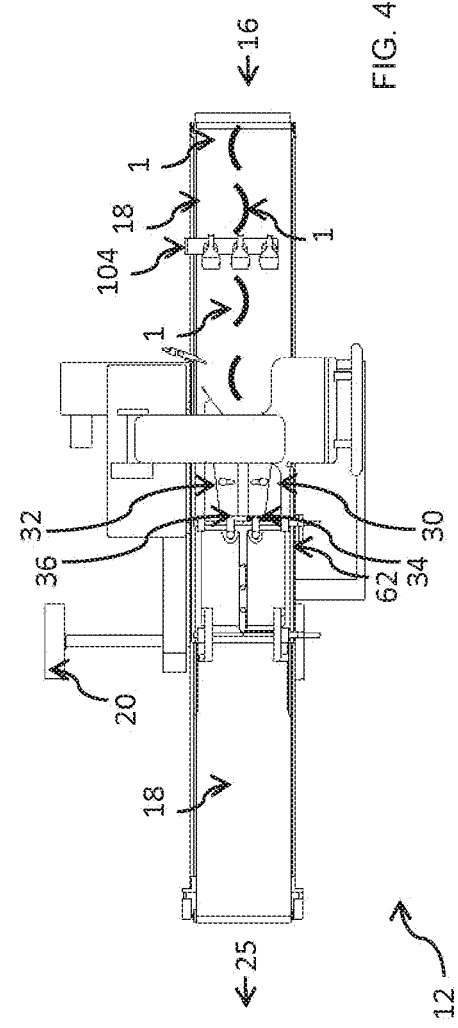

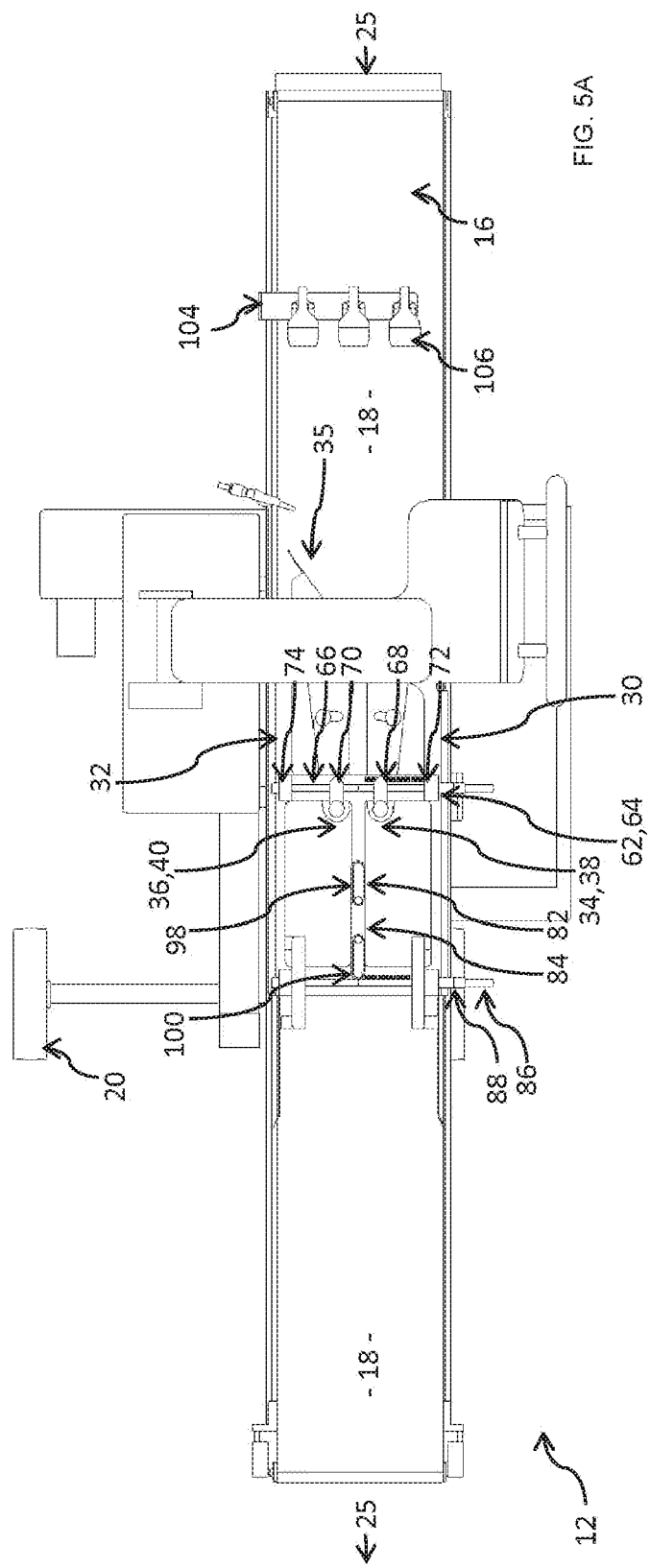

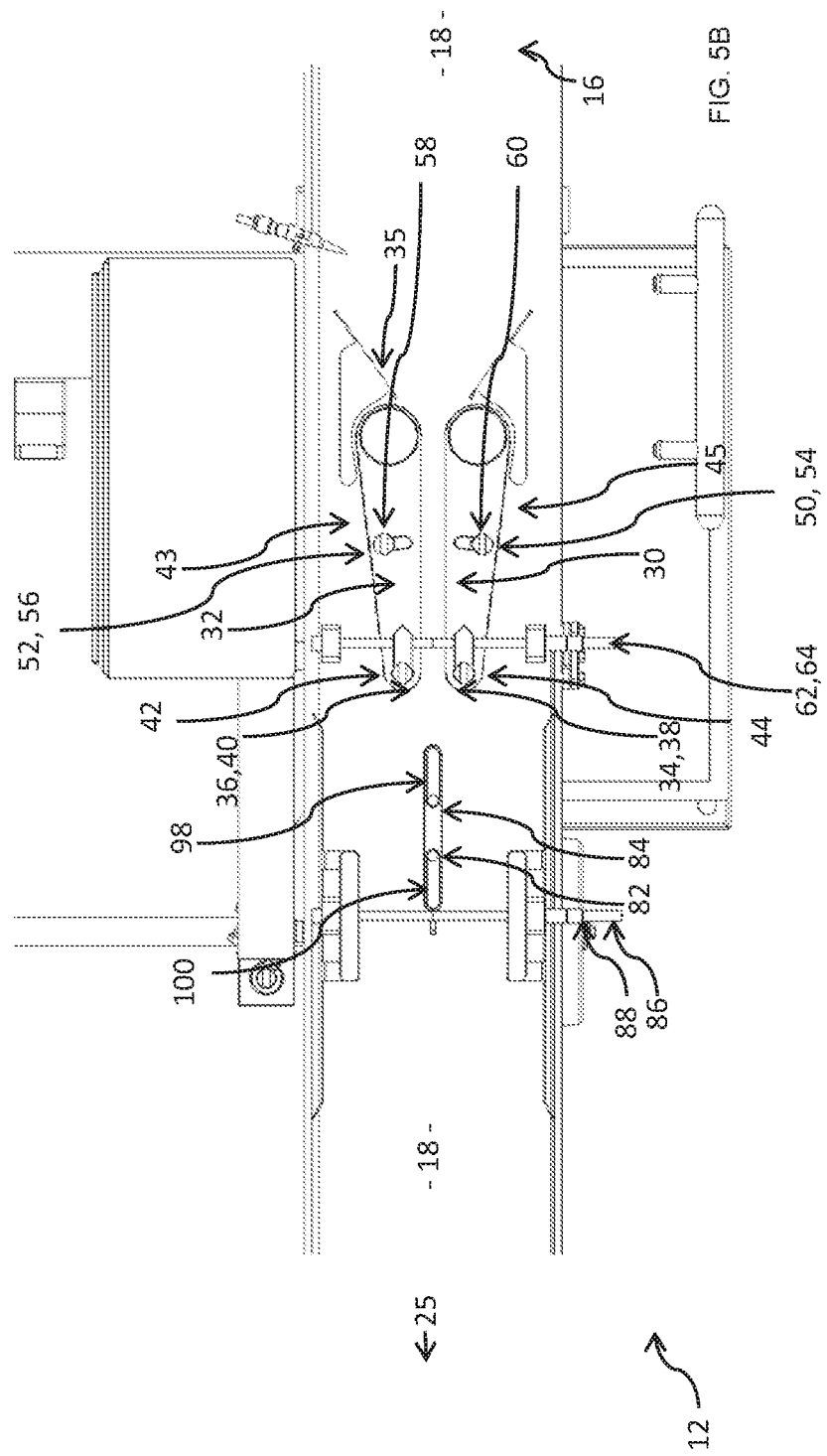

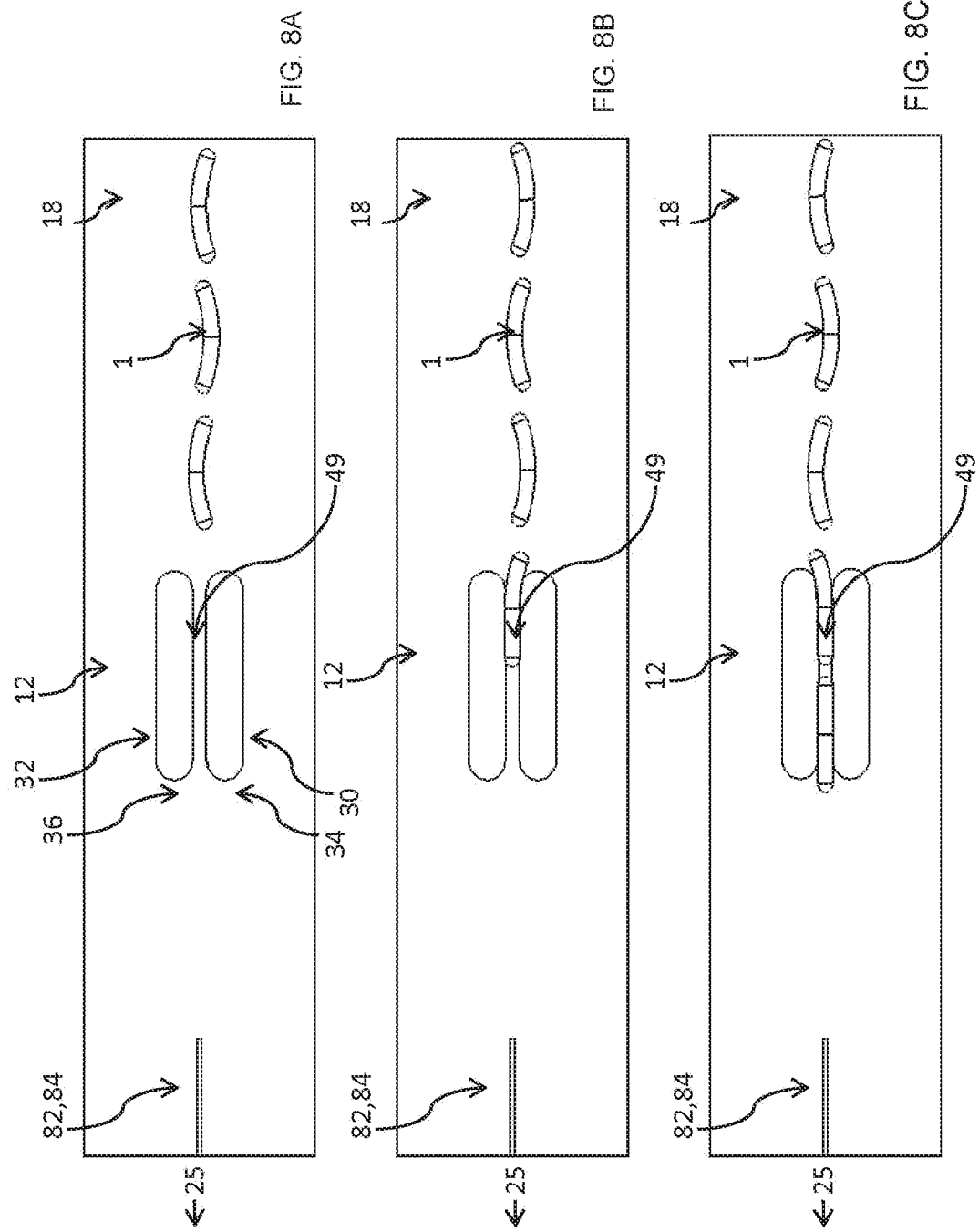

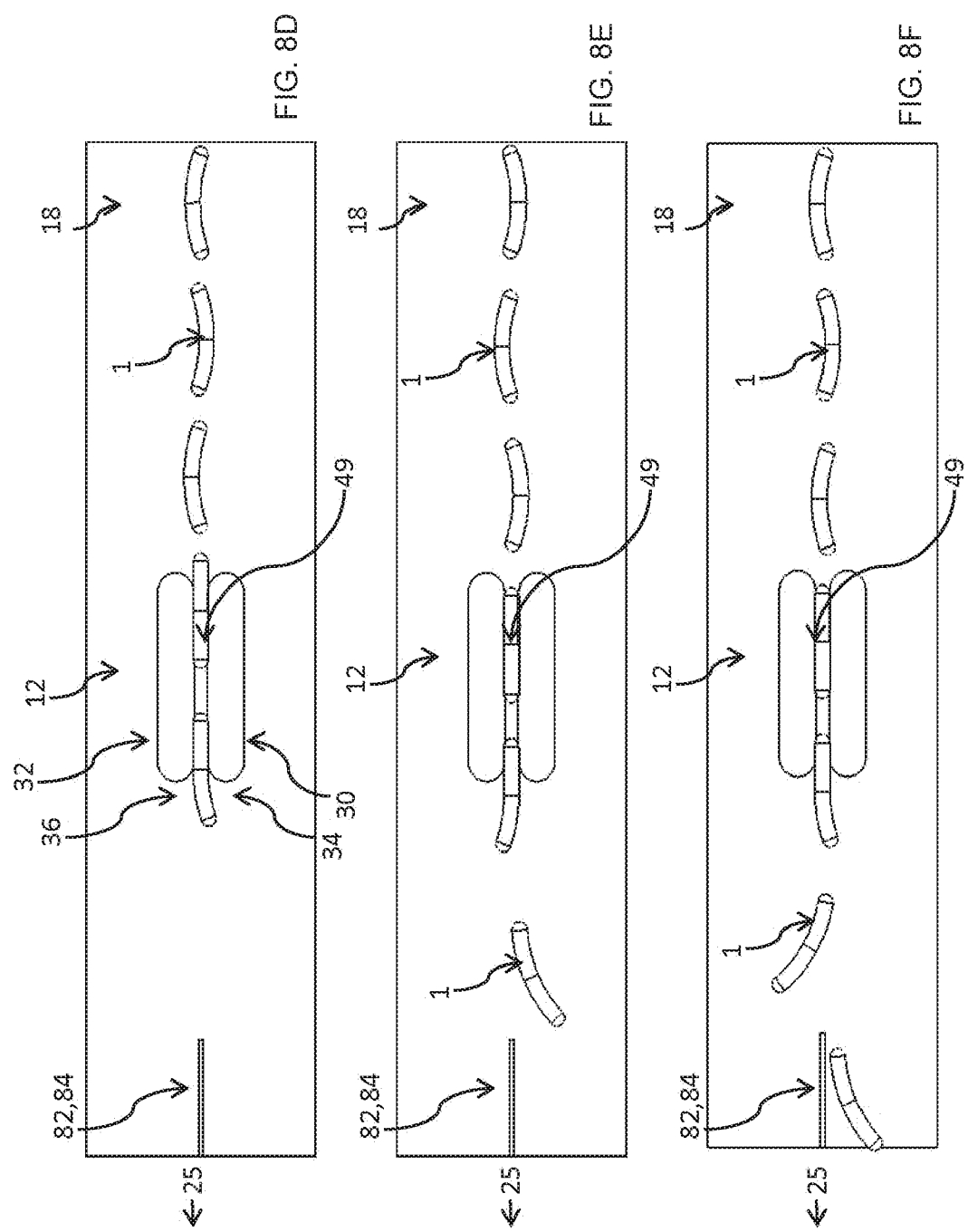

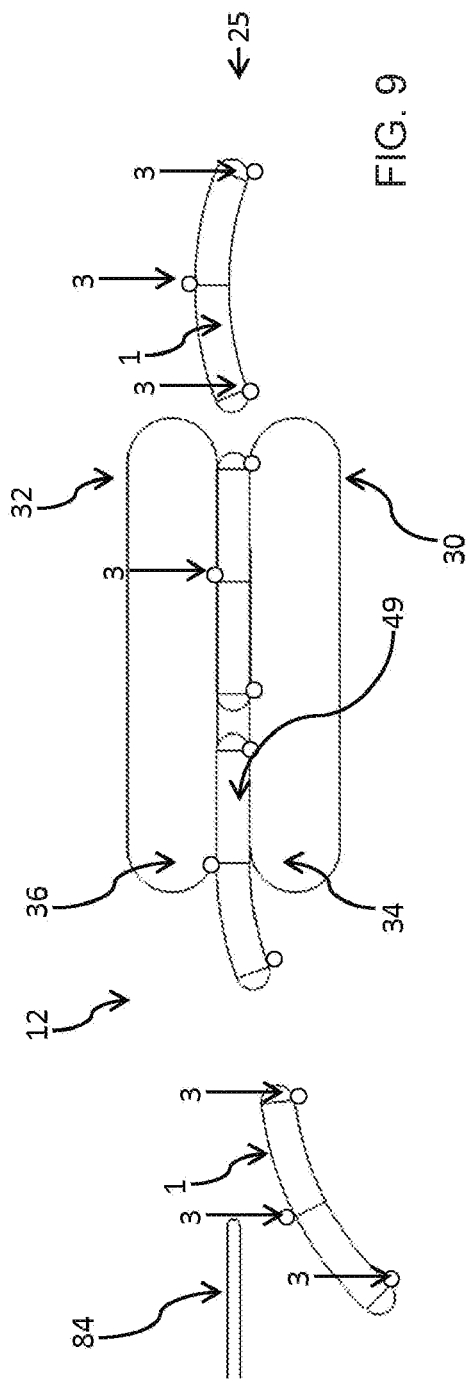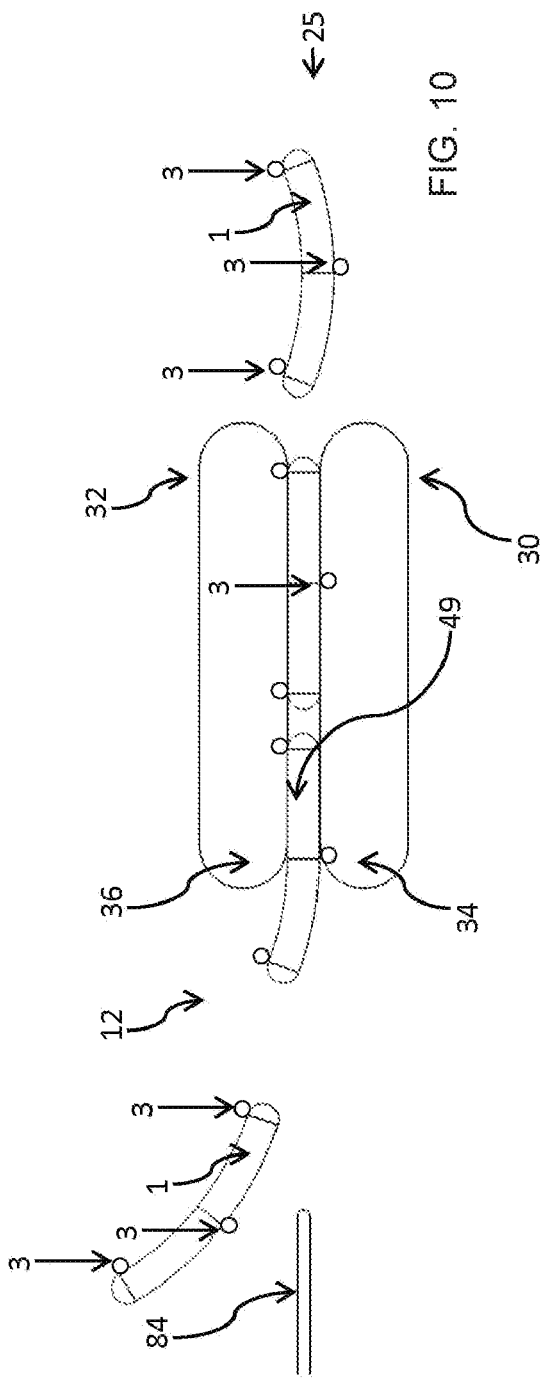

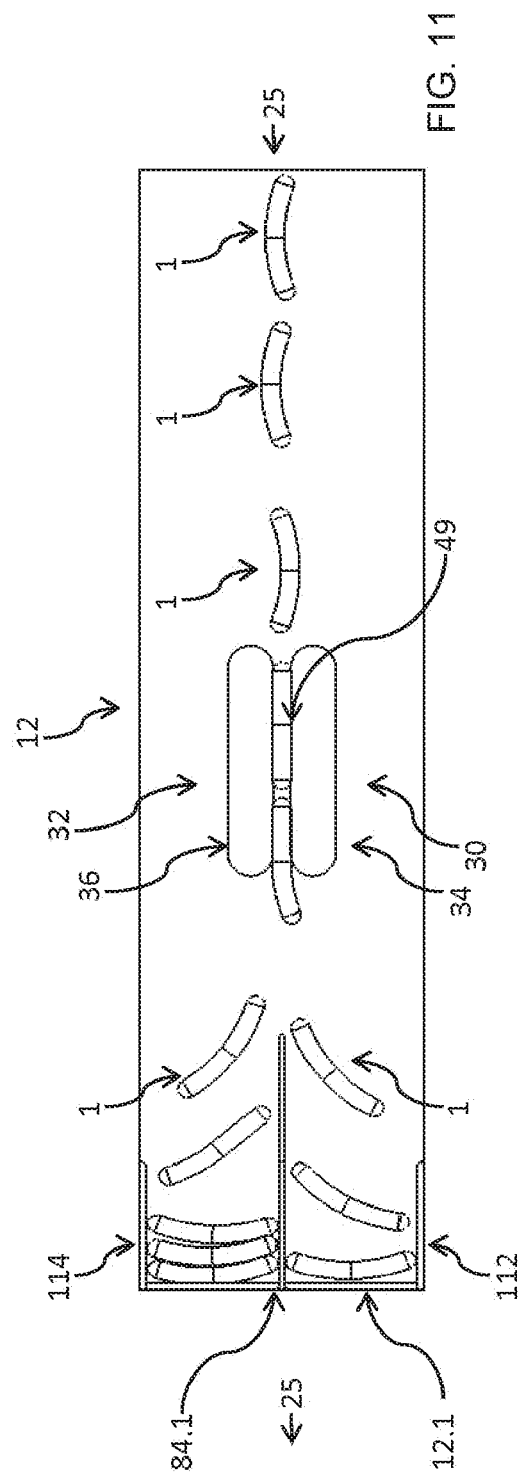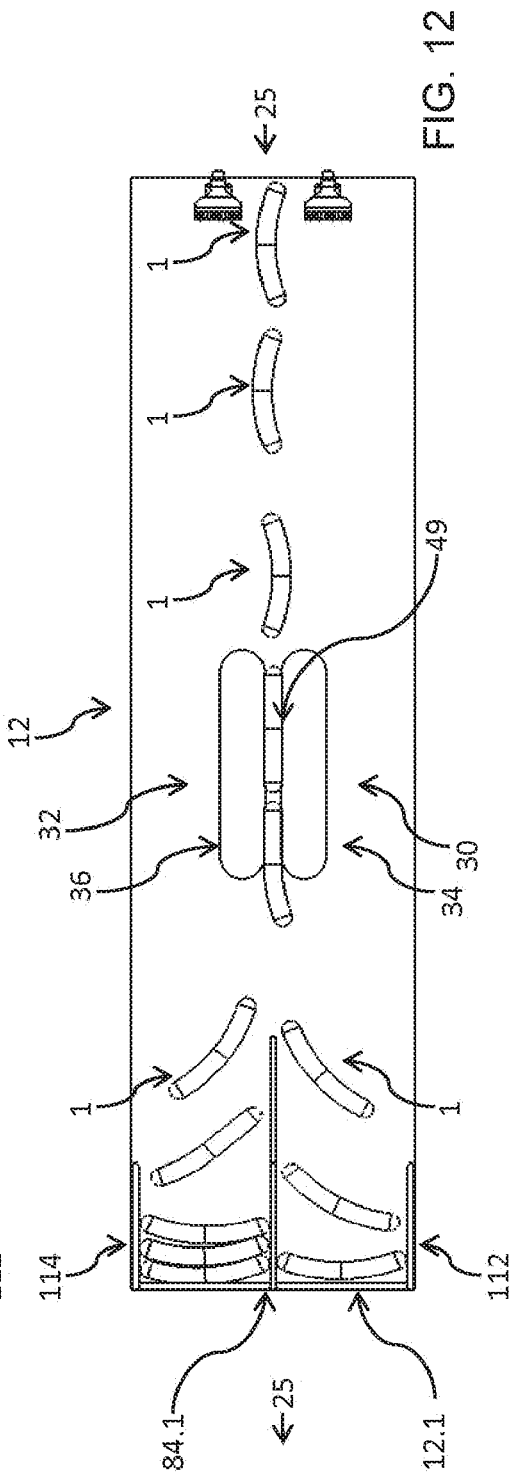

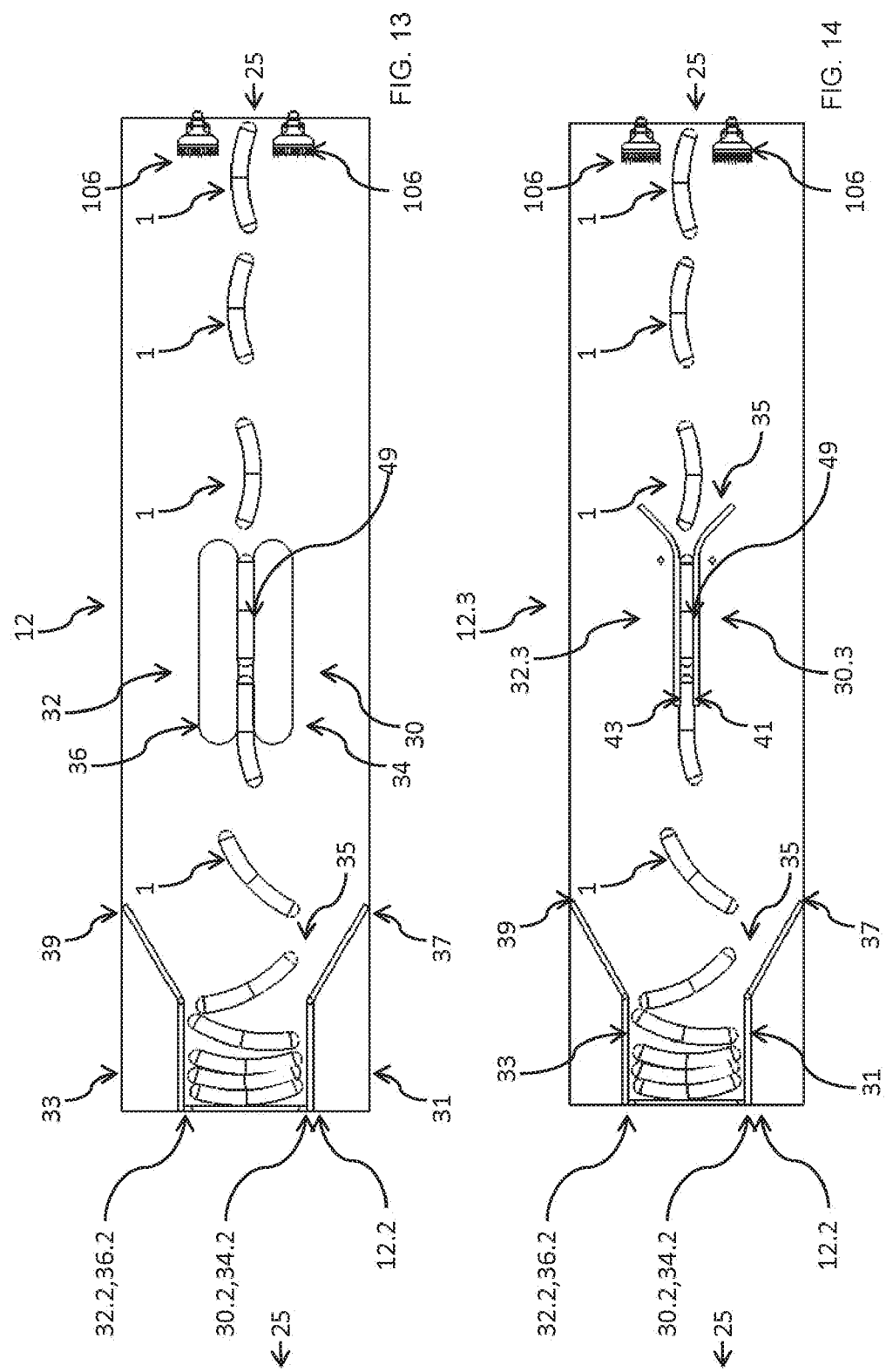

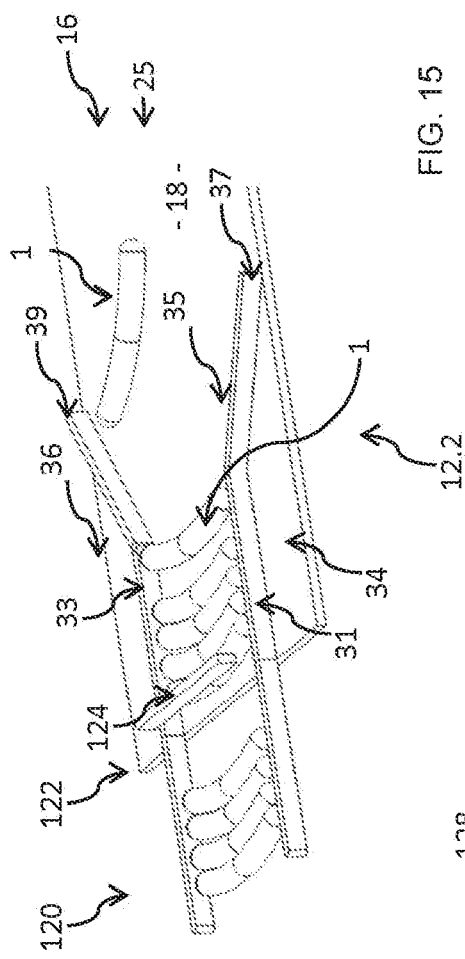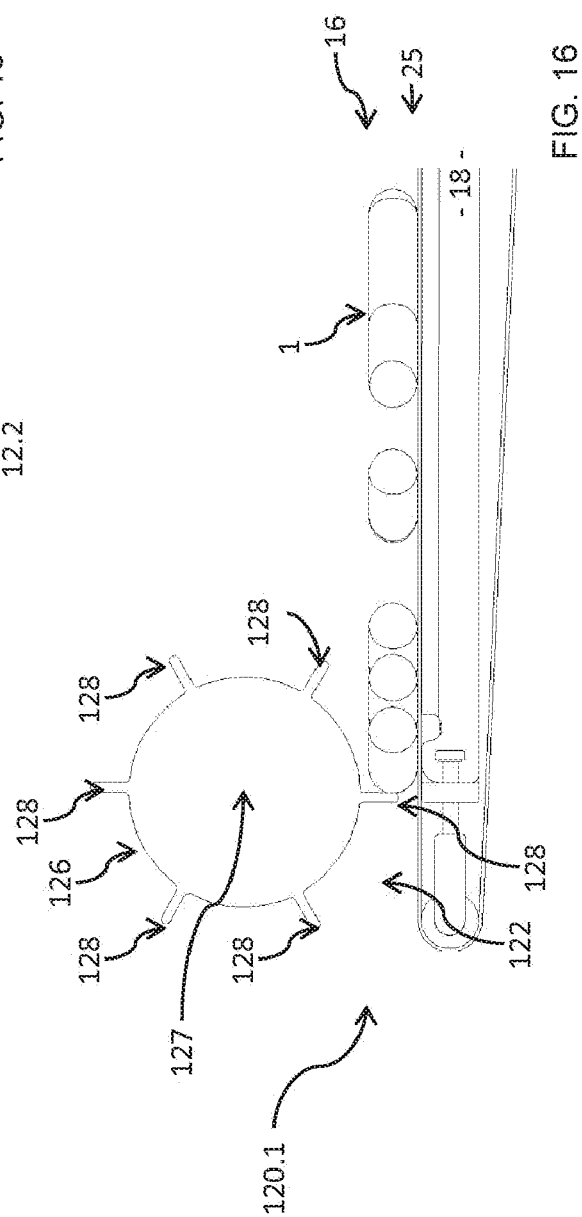

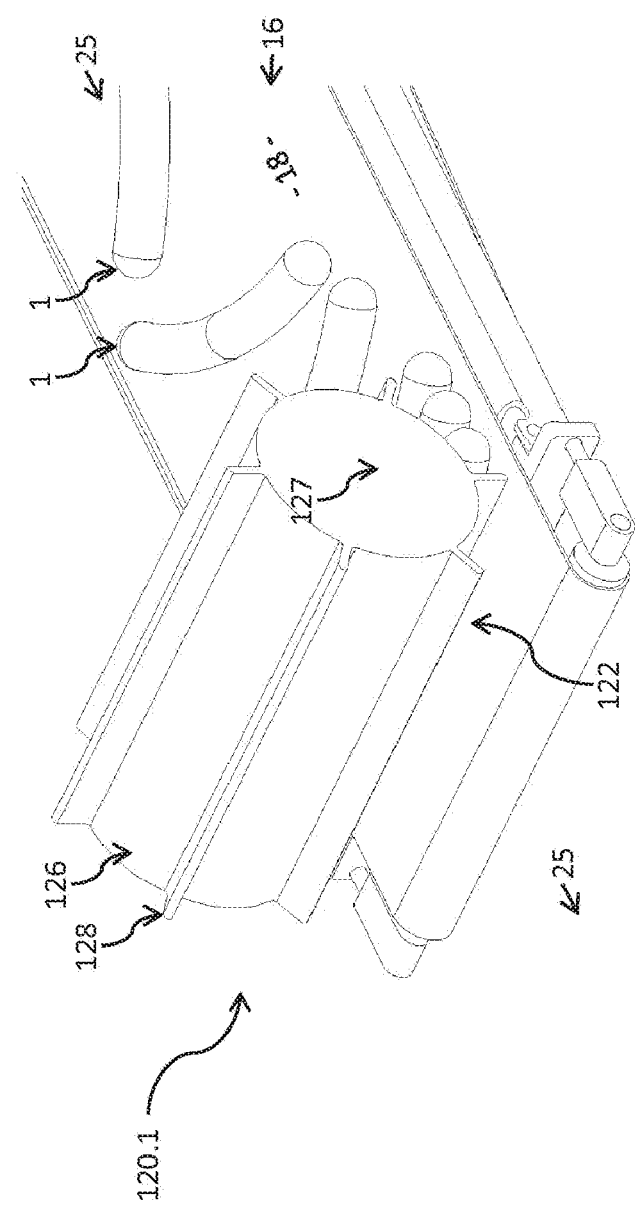

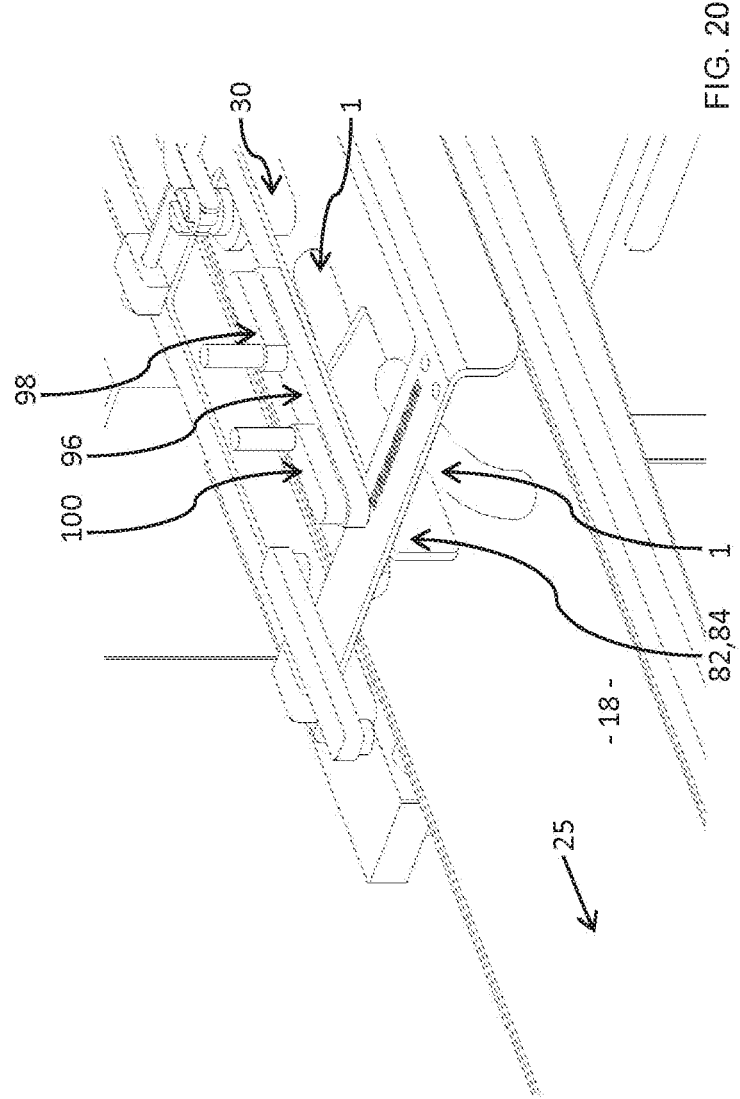

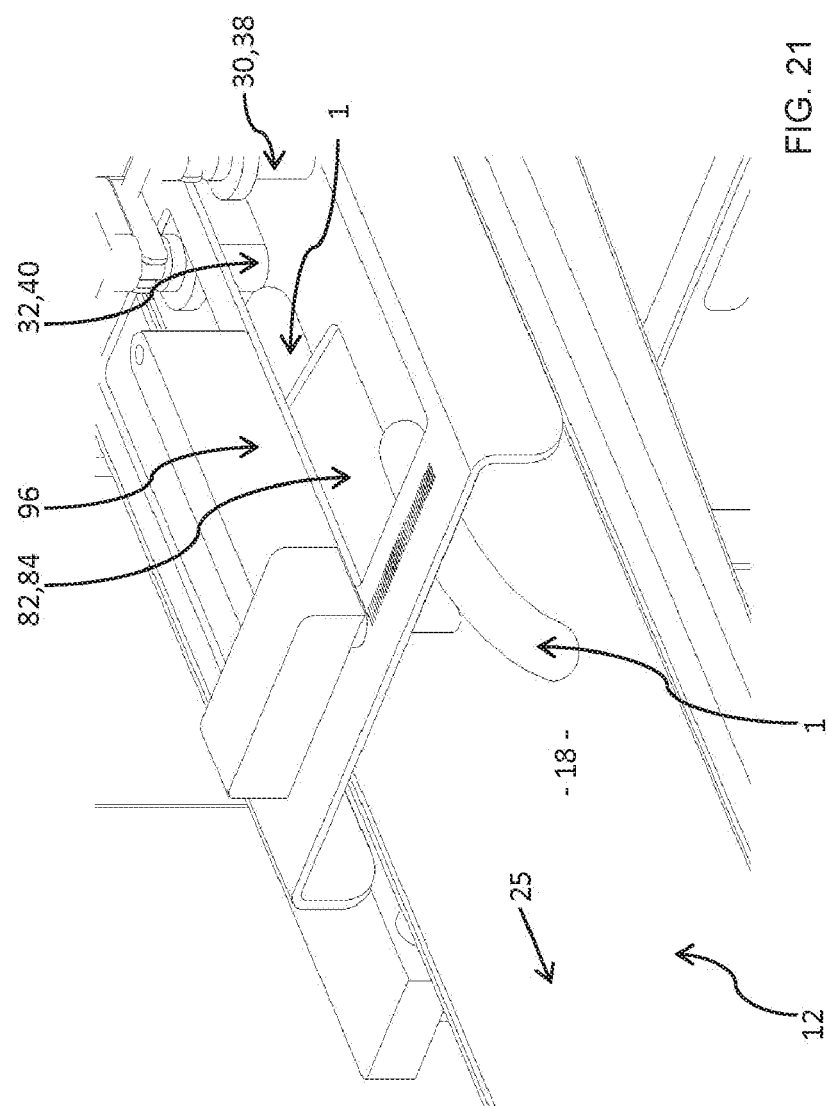

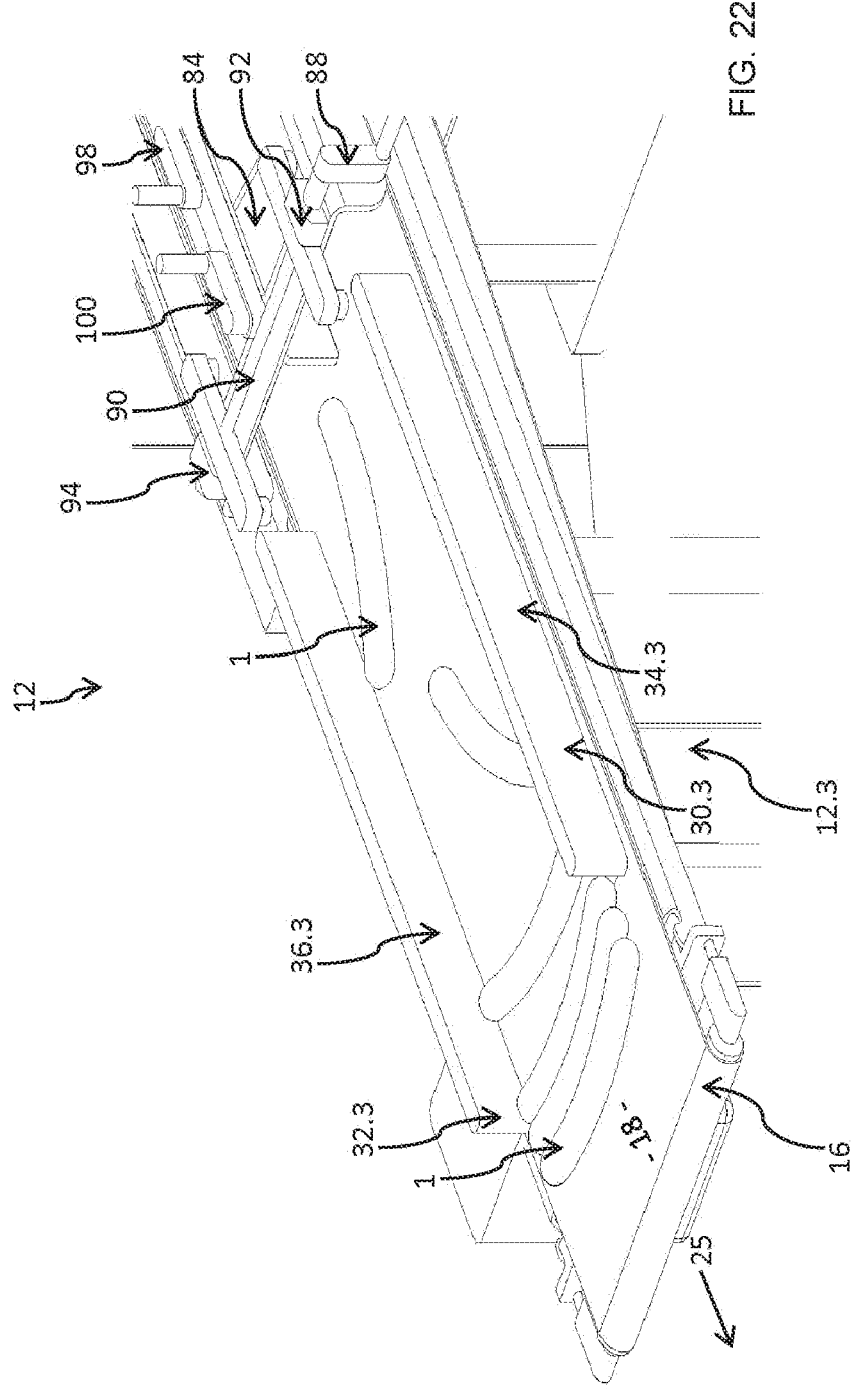

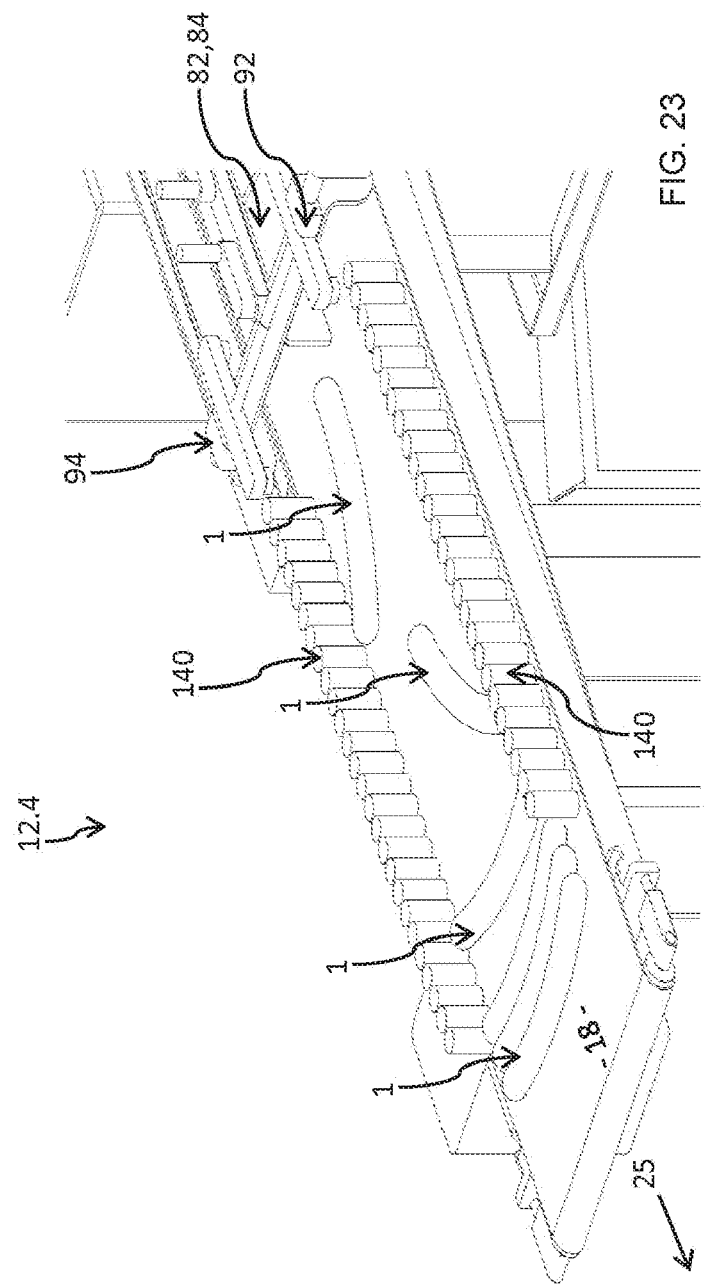

APPARATUSES AND METHODS OF ORIENTING SAUSAGES (NATURAL CASING SORTER)

BACKGROUND

The invention concerns an apparatus for orienting sausages, having at least one conveyor device with a moveable, in particular circulating, conveyor element on which individual sausages can be placed and transported in a conveyor direction along a path of movement. The invention further concerns a system for orienting sausages.

The invention also concerns a method of orienting sausages in which individual sausages are placed on a moveable, preferably circulating conveyor element of a conveyor device, and the sausages are transported along a path of movement on the conveyor element.

In the industrial production of portions of pasty foodstuff like sausages, a plurality of machines are combined in so-called sausage lines to form a mutually matched system. Sausages of differing quality, length or caliber can be produced by machines which are individually matched to each other in a production line. For example, sausages can be produced in natural, artificial or collagen casings. By means of a filling machine and attachments connected thereto the pasty foodstuff, e.g., the sausage meat, can be introduced into the casing. Individual portions can be produced by means of a twisting-off device. The portions can be separated into individual sausages by means of a separating device. Thus, up to more than 1,000 sausages per minute can be produced in a sausage line. The sausages can be subjected to further processing in various ways and packaged by means of packaging machines. Individual portions, like for example sausages which split or burst during production, are to be sorted out prior to packaging, that is to say removed from the process.

In regard to packaging by means of packaging machines, it is frequently necessary for sausages (or similar individual portions) to be oriented or sorted. Besides sorting on the basis of length, sorting on the basis of curvature of a portion may also be desired or required. Thus, it may be desirable, for example, for a group of a plurality of individual curved sausages to be placed in mutually juxtaposed relationship and possibly also in mutually superposed relationship in a package, for example a tray. In that case, it may be desirable for curved sausages to be placed in the tray directed in the same direction. In that respect there is the difficulty that the sausages produced after production, in particular after separation of individual portions by means of the separation device, are curved randomly and in various directions, and in no case do they involve identical or homogeneous curvature. Instead, the sausages occur randomly involving curvature to greatly different degrees and curvature in different directions. That is the case even when the individual sausages are placed on a conveyor device with an, in particular, circulating conveyor element, for example a conveyor belt. In terms of their curvature, the sausages involve different orientations, that is to say sometimes the curvature faces towards the right or sometimes towards the left, when the sausages are on the conveyor belt.

Reliable orientation and organization and/or sorting of curved sausages with an acceptable process speed has hitherto been a problem in sausage lines. While grouping of straight portions, for example straight sausages, is possible, there is a lack of technical systems which would be capable of implementing reliable orientation and sorting of curved sausages at an acceptable speed.

DE 4 007 803 A1 discloses an apparatus and a related method of transferring sausages. The sausages initially involve an orientation such that the longitudinal axis of the sausages extends parallel to the transport direction. The sausages oriented in that fashion are now introduced into a deflection device and turned thereby substantially through 90° so that the longitudinal axis of the sausages is now oriented transversely relative to the transport direction. The apparatus, however, is not suitable for sorting curved sausages on the basis of their curvatures.

US 2002/0115401 A1 discloses a conveyor and sorting apparatus for sausages, which makes use of the principle of a shaker belt, on which guides are provided for guiding sausages. By virtue of vibration and inclination of the belt, sausages pass into those guides and are conveyed in the transport direction.

No apparatus is disclosed, however, which would be suitable for implementing sorting of curved sausages between such guides. Sorting of curved sausages on the basis of their direction of curvature and subsequent grouping thereof are not disclosed.

SUMMARY

Embodiments of the present invention provide an apparatus for orienting and/or sorting individual portions, in particular curved sausages. Embodiments of the invention also provide a method of and a system for orienting and/or sorting sausages.

In a first aspect with an apparatus of the kind set forth in the opening part of this specification, embodiments of the invention provide two orientation devices which are spaced from each other transversely relative to the conveyor direction and disposed above the moveable conveyor element and having at least one respective guide for laterally guiding sausages, and wherein the spacing of the guides of the orientation device is so set that the curved sausage is elastically deformed by the spaced lateral guides and in that case at least approximately straightened or bent straight, and during further transport along the path of movement the front end of the sausage comes free from the guides of the spaced orientation device while a rear portion of the sausage still remains between the guides, the sausage then after coming free by virtue of the elasticity at least partially again assumes its previously more greatly curved shape and in that case the front portion of the sausage is moved in a direction transversely relative to the conveyor direction and thus at least approximately transversely relative to the path of movement of the sausage.

By means of the two orientation devices according to embodiments of the invention which are spaced and arranged above a conveyor element, for example a circulating conveyor belt, each having a respective guide, the individual sausages can be oriented in a simple and reliable fashion and at high speed in the context of an industrial process. An individual curved sausage passes on the path of movement by means of the conveyor element between the two guides of the spaced orientation devices. A curved, flat sausage disposed on the conveyor element is centered and guided between the guides.

The spacing of the guides of the orientation apparatus can be, in particular, so selected and adjusted that the curved sausage is elastically deformed by the spaced lateral guides and, in that case, is at least approximately straightened or bent straight. In such an elastically deformed, at least approximately straightened state, it is firstly further transported by means of the conveyor element along the path of movement. Thus, a situation in particular can occur in which the two end portions of the sausage bear against the guide of the one—lateral—orientation apparatus, while an oppositely disposed central (at least partly convex) region of the sausage bears against the mutually opposite spaced guide of the second orientation apparatus. During further transport along the path of movement, the front end of the sausage comes free from the guides of the spaced orientation apparatus at a moment in time, while a rear portion of the sausage still remains between the guides, for example a central portion still bears against one of the guides and the rear end portion still bears against the oppositely disposed guide. By virtue of the energy within the sausage, stored by the elasticity thereof, the straightening effect and elastic deformation, the sausage, after coming free, will then at least partially again assume its previously more greatly curved shape. In that case, the front portion of the sausage is moved in a direction transversely relative to the conveyor direction and thus at least approximately transversely relative to the path of movement of the sausage. Sausages with a curvature towards one side, for example towards the right, after coming free from the guides of the orientation apparatuses, will bear somewhat more against one side of the conveyor element, in particular with the front portion, while sausages with a curvature towards the other side, for example towards the left, face more towards the left, in particular with their front portion. Thus successive sausages, after passing through the two orientation apparatuses, are either oriented somewhat more towards the left on the conveyor element or disposed on the left there, or are oriented towards the right or are disposed somewhat more on the right on the conveyor element. As a result, the sausages thereafter following such orientation, can be sorted according to their respective curvature. The spacing of the two guides relative to each other may be adapted and adjusted to the respective caliber and/or the lengths of the portions. In an embodiment of the invention, the portions or sausages are to be at least temporarily somewhat straightened or bent straight by the guide and by virtue of their inherent elasticity can then go back again at least partially into a curved shape. During transport by means of the conveyor device along the guides, the portions, that is to say the sausages, should not be decelerated or not substantially decelerated. In that way, sausages can be oriented according to the invention in respect of their differing curvatures.

If alternatively the spacing of the guides of the orientation apparatuses is approximately adapted to a length of the portioned sausages or other portions of foodstuffs, it is possible for sausages, by means of the orientation apparatus according to the invention, by virtue of the fact that they pass into the region of influence of the two guides during transport of the sausages, to be alternatively also so oriented that, after passing through between the guides, they are oriented substantially transversely relative to the conveyor direction.

In a development of the invention, it is proposed that each orientation device respectively has an elongate guide extending in the conveyor direction for the sausages, wherein the guides are disposed in mutually opposite spaced relationship transversely relative to the conveyor direction. The sausages can be reliably oriented using structurally simple means by virtue of the guides extending over a distance in the conveyor direction.

In a preferred embodiment, it is provided that the spacing of the guides of the two orientation devices is adjustable by means of an adjusting device. As the spacing is to be adapted to the caliber and/or the length of the sausages, such an adjusting device presents itself as a good option as it is possible in that way for the spacing to be comparatively easily and comfortably adjusted in operation.

In a development, it is proposed that the length of the guide and the spacing of the mutually opposite guides is variable relative to each other and can be adapted to the length of the sausages. It is desirably proposed that the length of a guide approximately corresponds to the length of a sausage and the spacing approximately corresponds to the caliber of a sausage or at least the length of a sausage and the spacing corresponds at least to the caliber of a sausage.

In a preferred alternative embodiment, it is proposed that the guide is in the form of a substantially rigid rail or in the form of a circulating belt extending substantially in the conveyor direction or in the form of a roller track. A rigid rail is a relatively simple structural element which can ensure the orientation effect according to embodiments of the invention. The material of the rail should preferably be so selected that the friction between a sausage and the rail is slight. An alternative that presents itself is the provision of a circulating belt extending in the conveyor direction or a roller track as the guide, for in that way the friction can be reduced and it would also be possible to implement easy adaptation of the length to the lengths of the sausages and the form of the guide could possibly also be advantageously varied.

In a further alternative embodiment, it is proposed that the mutually opposite guides—in a first region—form a feed region in which the spacing of the mutually opposite guides decreases in the conveyor direction and an orientation region which adjoins the feed region and in which the spacing of the mutually opposite guides remains substantially the same. By virtue of the fact that the guides form a feed region, individual sausages can be advantageously centered between the guides and reliably fed to the orientation apparatus. In that case, the decreasing spacing forms a kind of introduction funnel so that the sausages can be reliably fed while being transported on the conveyor element. The orientation region can then be formed following the feed region directly or also at a certain spacing, in which orientation region the spacing of the mutually opposite guide elements remains substantially the same so that this also provides for uniform reliable orientation. If, as described above, the sausages are to be separated and thus sorted in respect of their curvature into two groups, that is to say towards the left or the right on the conveyor element, it is particularly advantageous if the spacing in the orientation region is the same or somewhat larger than the caliber of the sausages to be oriented. If, as described above, orientation or sorting is to be effected in which the sausages are to be oriented substantially transversely relative to the conveyor direction, an advantageous provision is for the spacing of the guides in the orientation region to be substantially somewhat greater than the length of the sausages to be oriented.

In a preferred alternative embodiment, to reduce the friction between the guide and the sausage, it is provided that the guide element is a circulating so-called endless belt which is preferably drivable by motor means. An alternative embodiment is distinguished in that the guide is formed by a plurality of guide rollers involving a substantially vertical axis of rotation, wherein preferably a plurality of or all rollers are drivable by motor means. By using a plurality of rollers which are preferably driven by motor means, it is possible to provide for low-friction guidance which is thus particularly suitable for industrial production at a high rate.

A further alternative embodiment provides that the angle formed between the guides of the two spaced orientation devices is variable at least portion-wise relative to each other. If, for example, a more or less greatly pronounced acute angle can be set between the spaced guides, then in an individual situation, depending on the respective degree of curvature of the sausage, particularly effective orientation can be achieved on the conveyor element, wherein the orientation can either be towards left or the right on the belt depending on the direction of curvature or alternatively substantially transversely relative to the conveyor direction on the belt.

In a particularly preferred embodiment, it is proposed that there is provided a separating device arranged downstream of the orientation devices with respect to the conveyor direction for separating the previously oriented sausages, having a separating element arranged above the conveyor element of a conveyor device and projecting into the path of movement. By means of such a separating device, the previously oriented sausages can be sorted into two separate groups, wherein the one sausages, the curvature of which faces towards the right are placed towards the right and the sausages whose curvature is towards the left are placed further towards the left. The separating element can be a separating element which is arranged substantially centrally with respect to the two guides of the orientation apparatuses, preferably a separating plate or a separating element of plastic material. The separating action is effected in a particularly gentle fashion if, preferably, the separating device has a front element which enlarges in a wedge shape in the manner of a plough.

In a further embodiment, it is proposed that the spacing of the guides of the orientation devices is adjustable, preferably by means of at least one screw spindle drivable manually or by motor means. The guides can be relatively easily varied by means of a screw spindle or a similar device. There would possibly be no need for a separate fixing device by virtue of the friction of a screw spindle (self-locking action).

In a preferred alternative configuration, there is provided a device for applying a liquid lubricant to the conveyor element and/or the sausages, having at least one discharge nozzle for discharging liquid lubricant on to the conveyor element and/or the sausages and a feed line connectable to a pump for feeding the lubricant to the nozzle. Such a liquid lubricant, in particular water, provides on the one hand for a reduction in the friction between the guides and a sausage and on the other hand between the preferably endlessly circulating conveyor element and the sausage so that the individual sausages can easily slide on the conveyor element so that orientation by means of the guides is implemented with a low level of forces and thus gently. In that case, a simple nozzle or also a spray nozzle can be provided for spraying fine droplets of the lubricant. Desirably, it can be provided that a plurality of liquid discharge nozzles can be supplied with lubricant by means of a feed line and are arranged on a holding device above the moveable conveyor element.

In a further aspect, an abutment device is arranged adjacent to the moveable conveyor element and has an abutment for temporarily stopping one or more sausages on their path of movement, which is moveable into and out of the path of movement of the sausages, wherein the abutment cooperates with two mutually opposite guides which orient the sausage transversely relative to the conveyor direction By means of such an abutment according to embodiments of the invention which at least partially projects into the path of movement of the sausages along the conveyor direction, a number of sausages encounter the abutment and are stopped on their path of movement while preferably the conveyor element continues to run. Thus, during that active stoppage by means of the abutment, a plurality of oriented sausages can be grouped at the abutment. When therefore a row of sausages, for example five sausages, are stopped at the abutment in mutually juxtaposed relationship and are thus grouped, the abutment can be moved out of the path of movement into a passive position. The grouped sausages are then further transported together and are then placed for example by means of a packaging machine in a tray or dish or another container. That procedure for grouping sausages by means of the abutment can be repeated as often as may be desired and for any number in a group.

It is preferably provided that the orientation apparatus with abutment is arranged following an orientation apparatus having two spaced orientation devices with guides, as described hereinbefore, and thus the two orientation apparatuses cooperate with each other, because in that way the sausages can firstly be oriented in respect of their curvature and can then be respectively grouped by means of the abutment.

In a development, it is provided that the abutment is in the form of a rail which extends substantially transversely relative to the conveyor direction and which is moveable into and out of the path of movement by means of a guide and drive device in a substantially vertical direction. The abutment can be easily implemented in that way and moved from a passive to an active position.

In a preferred development, it is proposed that the abutment device is in the form of a roller which extends substantially transversely relative to the direction of movement and has a plurality of projections forming abutments, which are rotatable into and out of the path of movement of the sausages by rotation, wherein preferably the roller having the projections is drivable by motor means. Low-friction and thus rapid grouping of sausages can be implemented by means of such a roller having a plurality of abutments projecting therefrom. The roller can be arranged above the conveyor element of the conveyor device or adjacent thereto, for example downstream thereof.

In a further aspect, in accordance with the invention, there is proposed a system for orienting sausages, having an orientation apparatus, two spaced orientation devices with guides and an orientation apparatus with abutment for temporarily stopping one or more sausages.

In a preferred development, there is provided a packaging installation which follows in the conveyor direction for individually placing sausages in individual packages and for transporting the filled packages away.

Also particularly preferred is an upstream-disposed filling machine which belongs to the system, for producing individual sausages and a separating device for separating joined sausages and for transfer to an orientation apparatus according to the invention.

In addition in accordance with a further aspect of embodiments of the invention, a method is provided in which individual curved sausages are disposed on a moveable, preferably circulating conveyor element of a conveyor device, the sausages are transported along a path of movement on the conveyor element, the sausages are introduced into an orientation apparatus between two spaced orientation devices, wherein the spacing of the orientation devices is so selected that the curved sausage is elastically deformed by the spaced lateral guides and in that case is at least approximately straightened or bent straight, during further transport along the path of movement the front end of the sausage comes free from the guides of the spaced orientation apparatus while a rear portion of the sausage still remains between the guides, the sausage then after coming free by virtue of the elasticity at least partially assumes again its previously more greatly curved shape, and in that case the front portion of the sausage is moved in a direction transversely relative to the conveyor direction and thus at least approximately transversely relative to the path of movement of the sausage.

In regard to the advantages of the method according to the embodiments of the invention, reference is made to the foregoing description of the orientation apparatus according to the embodiments of the invention, which also correspondingly applies to the method according to the embodiments of the invention. Sausages can be oriented and sorted in an effective and simple fashion by means of the embodiments of the invention, in respect of their direction of curvature.

In accordance with a development of the method, there is proposed the feed of the sausages oriented in the conveyor direction to a separating device and thus sorting of the sausages in two groups of sausages with uniformly oriented curvatures. This can preferably involve a separating device according to one of the above-described embodiments.

A further development of the method provides that the sausages are fed to an abutment at which at least one or more sausages are temporarily stopped on their path of movement and then one or more sausages can be further transported and optionally packaged in grouped relationship.

In the method, the sausages are preferably firstly introduced into a casing by means of a filling machine, then twisted off with a twisting-off device, then individually separated by means of a separating device, and then fed to an orientation apparatus, preferably an orientation apparatus according to at least one of the claims.

BRIEF DESCRIPTION OF THE DRAWINGS

The invention is described in greater detail hereinafter by means of preferred embodiments by way of example.

FIG. 1 shows a side view of a system including a plurality of machines and at least one apparatus according to the invention for orienting sausages.

FIG. 2 shows a side view of an orientation apparatus according to the invention.

FIG. 3 shows a front view of the orientation apparatus according to the invention.

FIG. 4 shows a plan view of the orientation apparatus according to the invention.

FIGS. 5a)-5b) shows an enlarged detail view of the apparatus of FIG. 4.

FIGS. 8a)-8f) show a method according to the invention for orienting sausages in a plurality of phases.

FIG. 9 shows an enlarged view of the method.

FIG. 10 shows an enlarged view of the method.

FIG. 11 shows a method according to the invention for orienting and sorting sausages.

FIG. 12 shows a method according to the invention for orienting and sorting sausages with the illustrated device for applying a liquid lubricant.

FIG. 13 shows a method according to the invention for orienting and sorting sausages with the illustrated device for applying a liquid lubricant with an orientation apparatus having a guide with a circulating belt.

FIG. 14 shows a method according to the invention for orienting and sorting sausages with the illustrated device for applying a liquid lubricant with an orientation apparatus having a guide rail.

FIG. 15 shows a perspective view of an alternative embodiment of an orientation apparatus for orienting and grouping sausages transversely relative to the direction of travel.

FIG. 16 shows a side view of a part of an orientation apparatus according to the invention with abutment device in the form of a roller extending substantially transversely relative to the direction of movement and having a plurality of projections forming abutments.

FIG. 17 shows a perspective view of the FIG. 16 apparatus.

FIG. 20 shows a perspective view of a further alternative embodiment of an orientation apparatus with adjusting device for adjusting a separating device.

FIG. 21 shows an enlarged portion from FIG. 20.

FIG. 22 shows an alternative embodiment of an orientation apparatus according to the invention having two orientation devices with a lateral guide in the form of driven belts for orienting sausages transversely relative to the conveyor direction.

FIG. 23 shows a further alternative embodiment of an orientation apparatus according to the invention having two orientation devices with lateral guide having a plurality of driven rollers for orienting sausages transversely relative to the conveyor direction.

DETAILED DESCRIPTION

Figure 6:
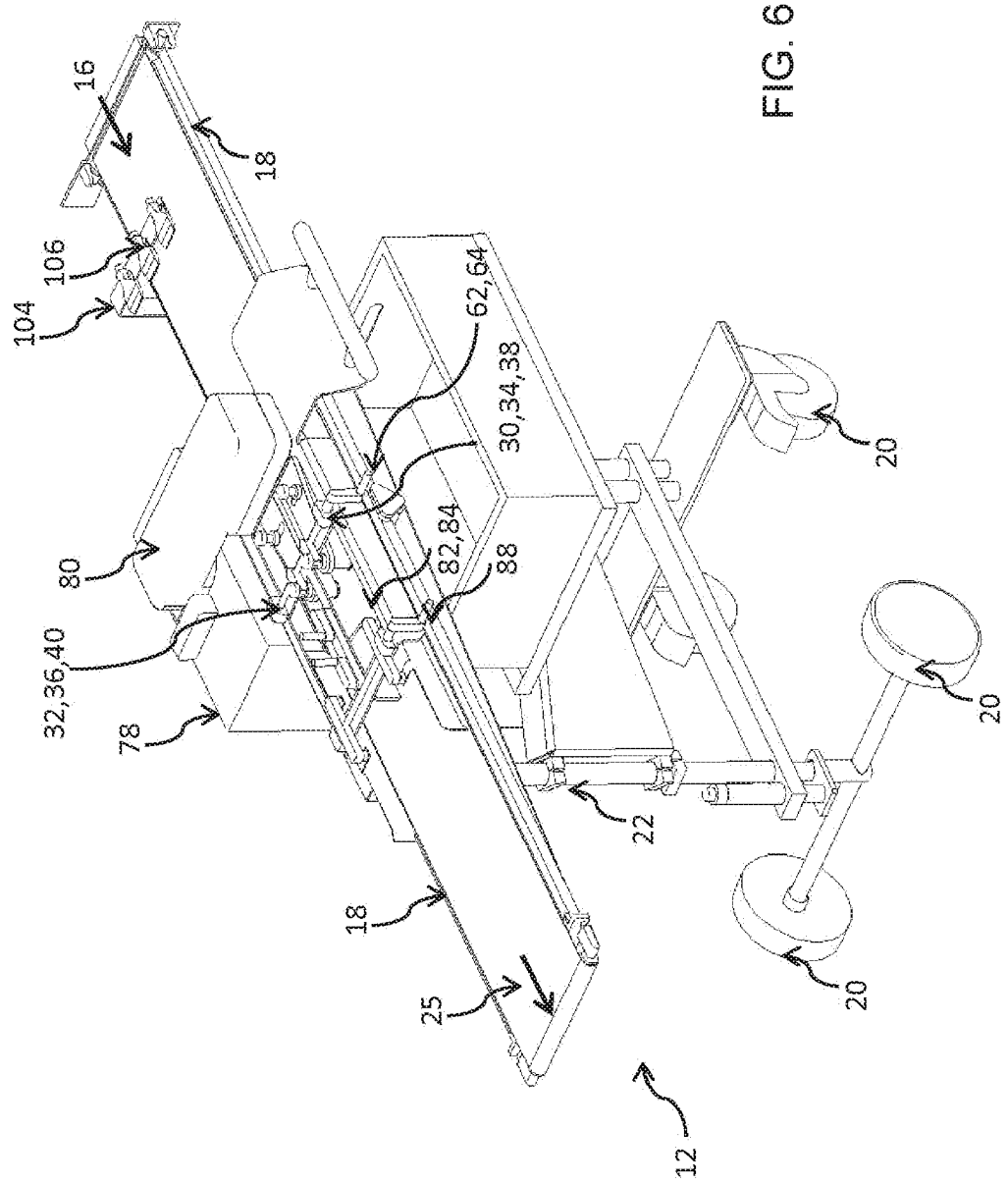
FIG. 6 shows a perspective view of the apparatus of FIG. 2.

The system 2 shown in FIG. 1 serves for the production and processing of portions of foodstuffs, in particular elongate sausages 1. The system includes a filling machine 4 with a filling hopper 6 for receiving a pasty foodstuff material like sausage meat for filling a casing, in particular a natural sausage casing, with the sausage meat, in addition a twisting-off device 8 for twisting off and thus producing twist locations between individual sausages 1, a separating device 10 for producing individual sausages by separation at the twist locations, and at least one apparatus 12 for orienting sausages and/or sorting sausages, also referred to hereinafter as the orientation apparatus 12, as well as a packaging machine 14 for individually placing sausages in individual packs and/or for transporting the filled packs away and/or for transporting oriented and/or sorted sausages away. The filling machine 4, the twisting-off device 8, the separating device 10, and the packaging machine 14 can be selected and assembled in accordance with the respective application, for example quality of the sausages, and can be combined with one or more orientation apparatuses 12. Individual sausages are fed to the orientation apparatus 12 and, after orientation or grouping or sorting, are transported away and optionally packaged by means of the packaging machine 14. Individual sausages are identified by reference numeral 1 in some of the following Figures.

In the embodiment of the orientation of the apparatus 12 shown in FIGS. 2 to 7, a conveyor device 16 having a moveable circulating conveyor element 18 in the form of an endless belt is arranged on a machine frame 22 displaceable on a plurality of rollers 20. The conveyor element 18, which is moveable by means of an electric motor (not shown) by way of at least one driven roller, is moveable with its respective upper portion in a conveyor direction 25, represented by an arrow. Individual sausages 1, as shown for example in FIGS. 8a-8f, can be placed on the conveyor element 18 in the form of the endless belt and transported in the conveyor direction 25 along a path of movement. The effective length of the conveyor element 18 can be optionally varied. Further components of the conveyor device 16 are a plurality of rollers, a drive motor, in particular an electric motor, an associated control system and frame elements; they are known to the man skilled in the art and are not described in greater detail here.

The orientation apparatus 12 has two orientation devices 30, 32 which are spaced from each other substantially transversely relative to the conveyor direction 25 and which are arranged above the conveyor elements 18, each having a respective guide 34, 36 which are arranged above the conveyor element 18 and which serve to guide and thus orient individual sausages 1 on their individual path of movement on the conveyor element 18. The orientation devices 30, 32, in particular the guides 34, 36 thereof, are so spaced from each other that an individual sausage 1 can pass and be guided or oriented therebetween while a sausage 1 is being transported and moved along its individual path of movement substantially in the conveyor direction 25 of the conveyor element 18. In that arrangement, the guides 34, 36 are arranged in mutually opposite relationship at a spacing from each other and with an intermediate space above the conveyor element 18. In the illustrated example, the guides 34, 36 are elongate, that is to say they extend not necessarily only but also and preferably substantially in the conveyor direction 25. In the illustrated embodiment, the guides 34, 36 are arranged in mutually opposite relationship and are of equal length. Deviations therefrom are also conceivable according to the invention, that is to say guides 34, 36 of different length as viewed in the conveyor direction 25 and arranged at different positions are also possible.

In this embodiment, each guide 34, 36 has a circulating guide belt 38, 40 which is tensioned between at least two rollers involving a substantially vertical axis of rotation, and is drivable by means of at least one driven roller so that the inner portion of the guide belt 38, 40 moves substantially or at least with a component of movement at least partially in the conveyor direction 25. The speed of the conveyor belt 38, 40 is adjustable by means of a control system (not shown but long known to the man skilled in the art) and can be matched to the speed of the conveyor element 18 of the conveyor device 16. Preferably, the speeds are the same in operation or do not differ very greatly from each other.

As FIG. 5b show, the rear deflection rollers 42, 44 as viewed in the conveyor direction 25 are not driven. The front drive rollers as viewed in the conveyor direction 25 are drivable by motor means. For that purpose, mechanical drive shafts are possible in a manner not shown here, optionally with the interposition of transmission assemblies or alternatively hydraulic or electric drives.

The tensioning rollers 43, 45 for further adjustment of the guide belts 38, 40 are displaceable along the slots 54, 56 by way of the holding elements 50, 52 and can be fixed by means of fixing screws 58, 60.

Adjustment of the positions of the rollers 43, 45 makes it possible to adjust the guide 34, 36 implemented with the belt 38, 40 at different angles relative to the conveyor direction 25.

The length of the guides 34, 36 and the spacing thereof is variable and can be adapted to the lengths and caliber of the sausages 1. In this embodiment, the length of a guide substantially corresponds at least to the length of an average sausage and the spacing corresponds at least approximately to the average caliber of a sausage 1. Here, the sausages 1 are transported between the guides 34, 36, wherein the longitudinal axes of the sausages 1 are oriented substantially parallel to the conveyor direction 25 and thus the sausages 1 are transported lengthwise between the guides 34, 36. Alternatively, as shown by means of alternative embodiments hereinafter and FIGS. 15 to 23, the spacing of the guides 34, 36 of the orientation devices 30, 32 can also be so selected that a sausage 1 is oriented substantially transversely relative to the conveyor direction 25 between two guides 34, 36.

The motor, in particular an electric motor or a hydraulic motor for the rear rollers 42, 44 for driving the guide belts 38, 40, is not shown in greater detail. Alternatively, provided in the region right at the front, viewed in the conveyor direction 25, in a manner not shown here, is a third drive roller which is driven by means of a motor and a transmission assembly and drive elements, wherein the motor can be arranged in the housing 78 and the drive elements can be arranged at least partially in the housing 80.

Figure 7:
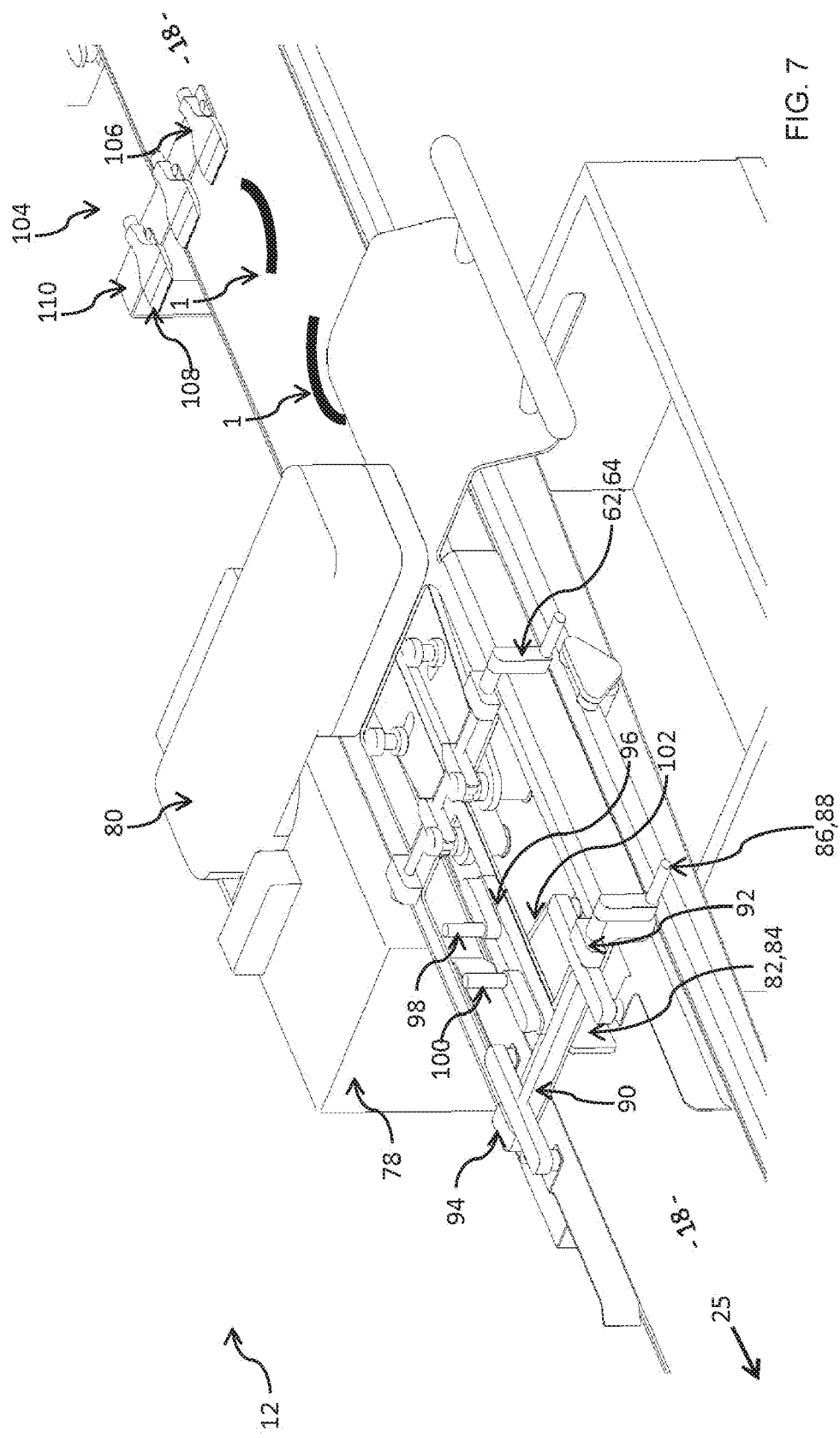
FIG. 7 shows an enlarged portion from FIG. 6.

The spacing of the rear rollers 42, 44 and thus the spacing of the guides 34, 36 can be adjusted by means of an adjusting device 62 (see FIG. 6 or FIG. 7). For that purpose, the adjusting device 62 has a hand crank 64, a screw spindle 66 which is at least partially provided with a male thread, and a respective adjusting block 68, 70, respectively provided with a female thread meshing with the male thread on the spindle 66, wherein the receiving means for the rear roller 42 and 44 respectively is fixed on each block 68, 70. The spindle 66 is mounted rotatably on bearing blocks 72, 74. The spacing of the guides 34, 36 can be adjusted relative to each other in a simple fashion by means of the adjusting device 62 which can also be formed using other technical means. In a fashion not shown here, the front rollers 46, 48 could also be adapted to be adjustable by means of the adjusting device 62 or a dedicated adjusting device (not shown), in which case that adjusting device could also be adapted to be operable manually, for example with a hand crank, or also by motor means.

As FIGS. 5 to 7 show, there is provided a separating device 82 for separating individual sausages 1 which are transported substantially in the conveyor direction 25 on the conveyor element 18 into two groups. The separating device 82 is preferably arranged downstream—with respect to the conveyor direction 25—of an orientation apparatus 12 with its two cooperating orientation devices 30, 32. In that way, previously oriented sausages pass into the region of influence of the separating device 82. The separating device 82 has a separating element 84 which is arranged above the conveyor element 18 (in the form of an endless belt) of the conveyor device 16 and projects into the path of movement of the sausages 1. The separating element 84 can be in the form of a flat element, in the form of a plate, a plastic element, for example a plate of PTFE, and/or in the manner of a plough. As shown in the Figures and as is preferred, the separating element 84 is arranged centrally with respect to the guides 34, 36 of the orientation devices 30, 32. Sausages 1 which have been oriented by means of the orientation apparatus 12 (as is also described hereinafter with reference to FIG. 8) thus pass into the region of influence of the separating element 84 and are deflected by same on the conveyor element 18 either somewhat towards the left, as viewed in the conveyor direction 25, or towards the right. This results in two groups or streams of sausages 1 which are further transported on the conveyor element 18 at least somewhat to the left and the right of the separating element 84. The streams of sausages 1 which are separated in that way (more to the left or more to the right on the conveyor element 18) are accordingly sorted in that way. They can then be fed to a respective further orientation apparatus 12, in particular an apparatus as described in greater detail hereinafter, with an abutment device 122, and can there be grouped or individually subjected to further processing, for example being packaged or grouped. For that purpose, it is possible also to use, in particular, the embodiments of the orientation apparatuses 12 shown in FIGS. 11 to 23.

The separating device 82 (see for example FIGS. 5 to 7 or 20 to 21) has an adjusting device 86 for moving and adjusting the separating element 84 in the direction of the conveyor device 25, see in particular FIG. 7. In an alternative configuration (not shown), it would also be possible for the separating element 84 to be moved into various positions transversely relative to the conveyor direction 25 and fixed in different positions. The adjusting device 86 has a first hand crank 88, a first spindle 90 (see FIG. 7) and bearing blocks 92, 94 cooperating in such a way that the separating element 84 is displaceable laterally or transversely—with respect to the conveyor direction 25. For that purpose, a holding member 96 in the form of an elongate bar cooperates with a thread on the spindle 90. In addition the separating element 84 can be displaced by means of two further hand cranks 98, 100 (FIG. 7 and FIG. 20) into different positions—lengthwise or axially with respect to the conveyor direction 25—relative to the holding member 96 and thus relative to the orientation apparatus 12 at different spacings and can thus be fixed in a set position. In that way, the separating element 84 is moveable lengthwise relative to the conveyor direction 25 into various positions and can be fixed in same. In that way, the separating device 82 can be optimally adjusted in relation to the properties of the sausages 1. Alternatively, the separating device 82 can also have a front element which enlarges in a wedge shape, or, as shown, it can have a front surface 102 which extends inclinedly upwardly in the conveyor direction 25.

A device 104 (FIGS. 4 to 7) serves for applying a liquid lubricant like in particular water to the conveyor element 18 and/or the sausages 1 and has at least one discharge nozzle 106, here three discharge nozzles 106, for discharge of the liquid lubricant. Each nozzle 106 has one or more openings 108 with which the lubricant (water) can be discharged or preferably sprayed so that water passes on to the conveyor element 18 and/or the sausages 1. The friction between the sausages 1 and the conveyor element 18 and the sausages 1 and further elements of the orientation apparatus 12 or the separating device 82 or other components is reduced in that way, which promotes orientation of the sausages 1 and/or grouping and/or sorting thereof. The sausages 1 can be moved and oriented on the conveyor element 18 with low force levels. In a manner not shown in greater detail here, the nozzles 106 are coupled with hoses and/or pipes to at least one pump which can deliver the lubricant to the nozzles 106 from a lubricant source or a lubricant container. The pump is controllable by means of an electric motor actuated by the control system. The nozzles 106 are fixed to a holder in the form of a carrier 110 on the frame 22.

FIGS. 8a) to 8f) show the orientation apparatus 12, the separating device 82, and a method of orienting sausages 1 and/or sorting same by means of an orientation apparatus 12 and by means of a separating device 82 having a separating element 84. Individual sausages 1 are transported from right to left in the conveyor direction 25 in the Figures by means of the conveyor element 18 on which the sausages 1 rest, see FIG. 8a). As shown in FIG. 8b), an individual sausage 1 passes into the region of influence of the orientation apparatus 12 and with its front portion between the guides 34, 36 of the orientation devices 30, 32. The sausages 1 are oriented lengthwise substantially in the conveyor direction 25. By virtue of the selected spacing between the guides 34, 36, the curved sausages 1 are at least somewhat straightened and deformed, in that case at least partially or substantially elastically, see FIG. 8c). Some sausages 1 are disposed on the conveyor element 18 with their curvature towards the left, others towards the right, with respect to the conveyor direction 25. Accordingly, the sausages 1 are deformed differently in the orientation apparatus 12. In the further course of the procedure, see for example FIGS. 8c) and 8d), the front portion of a sausage 1 passes out of the region of influence and out of the intermediate space between the guides 34, 36 and is deformed back again into its original state in accordance with the direction of the curvature by virtue of the elasticity of the sausage 1, see FIG. 8d, for example somewhat towards the left with respect to the conveyor direction 25. By virtue of the return deformation, due to the elasticity, the front sausage 1 is then moved at least somewhat towards the left with respect to the conveyor direction 25 on the conveyor element 18, see FIG. 8e). In the region of influence of the separating device 82, the front sausage 1 is moved in defined fashion further towards the left into a left group of sausages 1 on the conveyor element 18, see FIG. 8e). Such a sausage 1 is then further moved towards the left and sorted by means of the separating device 82; sausages involving such a curvature are therefore sorted into one group—on the left. As for example FIG. 8f) shows, another sausage whose curvature faces in the other direction is moved somewhat towards the right by virtue of its elasticity on the conveyor element 18 on moving out of the region of influence of the guides 34, 36. Consequently, that sausage 1 is oriented rather towards the right with respect to the conveyor direction 25. It is then oriented and sorted further in defined fashion into a right group of sausages by means of the separating device 82. This therefore provides for orientation of the sausages and sorting or grouping thereof depending on the respective direction of curvature.

FIGS. 9 and 10 are views on the enlarged scale showing sorting by means of—idealized—three contact points between sausage 1 and guide 34, 36 by virtue of the curvature or elasticity of a sausage 1. In FIG. 9, the sausage 1 is curved—towards the left—in such a way that the point 3, which is upper there, faces upwardly and two points 3 face downwardly. The points 3 could also be identified as contact points as they come into contact with the guides 34, 36 of the orientation devices 30, 32 during the process. This sausage which is curved towards the left with respect to the conveyor direction 25 passes into the space between the guides 34, 36 and is somewhat straightened. In the further progress in the method, the front portion moves somewhat further downwardly by virtue of the sausage elasticity so that the sausage is moved towards the left on the conveyor element 18 and is further sorted or oriented in defined fashion towards the left by means of the separating element 84 of the separating device 82. As FIG. 10 shows, another sausage whose curvature faces towards the right is so oriented upstream of the orientation apparatus 12 that the point 3 in the centre of the sausage faces downwardly while the two points 3 at the ends of the sausage face upwardly. This sausage too is straightened somewhat by the guides 34, 36. If the sausage 1 comes free from the guides 34, 36, it is oriented somewhat towards the right with its front region by virtue of its elasticity so that the sausage overall is moved towards the right on the conveyor element 18. It can then be sorted or oriented in defined fashion into a right group of sausages by the separating element 84 of the separating device 82. In the case of this effect, the fact that firstly the front portion of the sausage 1 comes free from the guides 34, 36 and deflects in a direction by virtue of the elasticity and the direction of the curvature while the rear portion is still between and is guided by the guides 34, 36 and cannot move except in the conveyor direction 25 also plays a part.

FIGS. 11 and 12 further show the orientation method. As described, the sausages 1 are oriented somewhat towards the left or the right respectively (upwardly or downwardly in the Figures) in accordance with their respective curvature, and thus grouped. The left and right group then comprises sausages 1 with the same curvature or curvature direction. Accordingly, two groups of sausages each having the same respective curvature are formed. In addition to the separating element 84.1, see FIGS. 11 and 12, a respective further guide element 112, 114 in the form for example of a guide bar or a guide plate or a guide web is arranged spaced from the separating element 84.1 entirely at the right or spaced entirely at the left, so that the sausages are guided and oriented in their respective group in such a way that then, as the Figures show, they are oriented not only in respect of their curvature but also substantially transversely relative to the conveyor direction 25. An individual further orientation apparatus 12.1 is formed by the separating element 84.1 with a respective guide element 112 and 114 respectively, the apparatus 12.1 being arranged downstream of the orientation apparatus 12. In that way, the sausages can firstly be oriented towards the left and the right and can then be oriented in their respective group with a homogeneous curvature constituting a left group and a right group respectively by means of the orientation apparatus 12.1. The orientation apparatus 12.1 represents an alternative embodiment of an orientation apparatus according to the invention with two guides, respectively formed by the separating element 84.1 and the guide element 112 and 114 respectively.

FIG. 13 shows an orientation apparatus 12 according to the invention and an orienting method as described hereinbefore, and reference is fully made to the foregoing description. An alternative additional orientation apparatus 12.2 according to the invention has two spaced orientation devices 30.2 and 32.2 respectively. The orientation device 30.2 has a guide 34.2 in the form of a rigid rail 31. The orientation device 32.2 has a guide 36.2 in the form of a rigid rail 33. The rails 31, 33 are approximately spaced from each other at a length of a sausage 1 or spaced somewhat greater than a length. The guides 34.2, 36.2 have or form a feed region 35 which is delimited and defined by two rigid guides 37, 39 arranged at an acute angle relative to each other, the feed region 35 narrowing in the conveyor direction 25. Formed adjoining the feed region 35 (see FIG. 14) is an orientation region 49 in which the sausages 1 are oriented as described hereinbefore so that they then bear against each other oriented in accordance with their curvature and substantially transversely relative to the conveyor direction.

The embodiment shown in FIG. 14 substantially corresponds to that described hereinbefore with reference to FIG. 13 and in that respect reference is fully directed to the foregoing description. The orientation apparatus 12.3 shown here differs from the above-described orientation apparatuses 12 substantially in that, instead of guide belts 38, 40, the guides 34, 36 are formed by rigid rails 41, 43 which are respectively an essential part of an orientation device 30.3, 32.3. The sausages 1 pass between rails 41, 43 whose spacing is approximately adapted to the caliber of the sausages 1 and are at least somewhat straightened in the intermediate space and are oriented in accordance with their curvature after passing through between the rails 41, 43. They then pass into the region of influence of the orientation apparatus 12.2 and are there oriented substantially transversely relative to the conveyor direction 25. The guides 41, 43 extend in their front portion in such a way that they have a feed region 35 in the manner of a funnel in order better to feed the sausages 1.

FIG. 15 shows an orientation apparatus 120 with abutment device 122 having an abutment 124. In regard to parts which are the same or similar, attention is directed to the above description of the previous embodiments. A conveyor device 16 having a moveable conveyor element 18, in particular in the form of a circulating endless belt, on which individual sausages 1 can be placed, serves for transporting the individual sausages 1 in the conveyor direction 25. An abutment device 122 having an abutment 124 serves for temporarily stopping one or more sausages on their path of movement. The abutment 124 is moveable into and out of the path of movement of the sausages 1. In the illustrated embodiment, the abutment 124 is adapted to be moveable for that purpose substantially vertically from above downwardly. For that purpose, the abutment 124 is preferably laterally guided in guides (not shown). It can be moved vertically upwardly and downwardly with a drive device. FIG. 15 diagrammatically shows such a moveable abutment 124 according to the invention. The man skilled in the art is aware of various means for producing the upward and downward movement of the abutment 124 and providing for appropriate guidance.

When the abutment 124 is in a stopping position in which it projects into the path of movement of the sausages 1, then individual sausages 1 are stopped at the abutment 124. In that case, the conveyor element 18 can be further moved in the conveyor direction 25. Preferably, a lubricant in the form of water is applied to the conveyor element 18 in the above-described fashion by means of a device 104 (FIGS. 4 to 7). In the stopped position therefore, the conveyor element 18 continues to move beneath the sausages 1. The individual sausages have been previously oriented by means of an orientation apparatus 12.2 according to the invention, see also FIG. 14, by means of two guides 34, 36 in the form of rigid rails 31, 33. The orientation apparatus 12.2 and the orientation apparatus 120 with abutment device 122 with the abutment 124 cooperate in the embodiment shown in FIG. 15. The individual sausages 1 are oriented in accordance with the invention, in a position substantially transversely relative to the conveyor direction 25. They are temporarily stopped by means of the abutment 124 so that a group of oriented sausages is formed at and in front of the abutment 124. The sausages 1 are thus arranged in closely spaced relationship with each other. If now the abutment 124 is moved out of the path of movement, for example upwardly, the group of oriented sausages 1 is then further transported by the conveyor element 18 in the conveyor direction 25, more specifically as the group as shown at the left in FIG. 15 (four sausages in mutually juxtaposed relationship). The group of sausages 1 can then be placed in a packaging, for example a tray.

FIGS. 16 and 17 shown an alternative embodiment of an orientation apparatus 120.1 and in regard to parts which are the same or substantially the same attention is directed to the foregoing description of the embodiment 120. Here, the abutment device 122 has a roll or roller 126 which is mounted rotatably about an axis of rotation 127 and at its periphery has a plurality of projections 128 forming individual abutments. By rotation of the roller 126, projections 128 respectively move into and out of the path of movement of the sausages 1. The roller 126 is drivable by motor means, by an electric motor or the like, and is controllable by means of the control system. If a projection 128 is disposed in the path of movement one or more sausages 1 are stopped at the projection 128, FIG. 16. A plurality of sausages are grouped in that way. The grouped sausages can then be released and further transported by further rotation of the roller 126.

Figure 18:
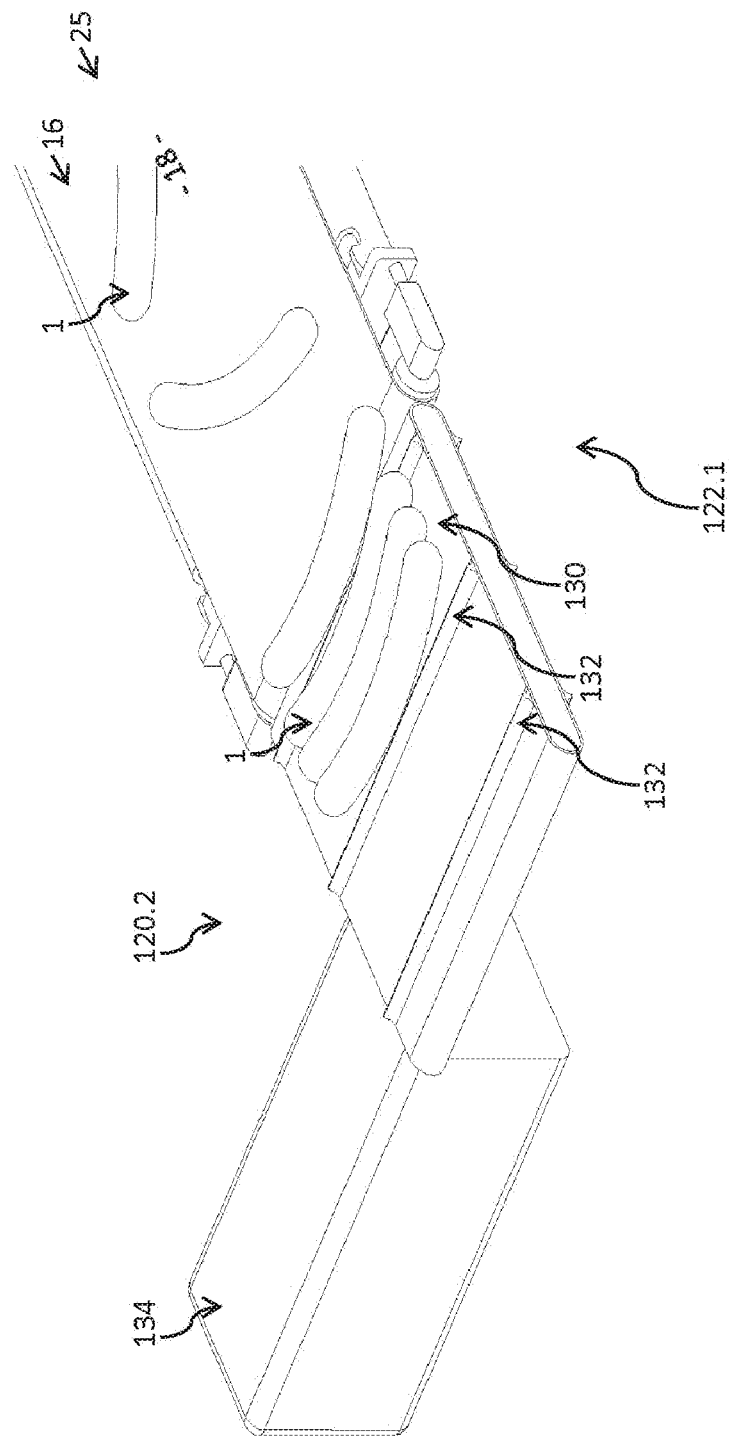
FIG. 18 shows a perspective view of an alternative embodiment of an orientation apparatus according to the invention with abutment device in the form of an endless belt extending substantially transversely relative to the direction of movement and having a plurality of projections forming abutments.

The orientation apparatus 120.2 shown in FIG. 18 having an abutment is similar to the above-described embodiment of FIG. 17, and in that respect reference is made to the foregoing description. The abutment device 122.1 differs from the above-described abutment device 122 in that here a circulating endless belt 130 has a plurality of projections 132 respectively forming an abutment for temporarily stopping one or more sausages 1. The belt 130 is guided and driven by means of a plurality of rollers (not shown in detail). A drive motor (not shown) is disposed in a housing 134 and coupled to at least one of the rollers. The belt 130 is arranged following the conveyor belt 18 in the form of an endless belt of the conveyor device 16 downstream in the conveyor direction 25. To stop one or more sausages, a projection 132 is moved into a given position and the endless belt 130 is stopped. A plurality of sausages 1, stopped by the projections 132, are then oriented, more specifically substantially transversely relative to the conveyor direction 25. When a number of sausages 1 has been grouped while still being disposed for example on the belt 16, the endless belt 130 can be switched on and the grouped sausages are further transported in the conveyor direction 25, for example to a packaging machine 14 (FIG. 1).

Figure 19:
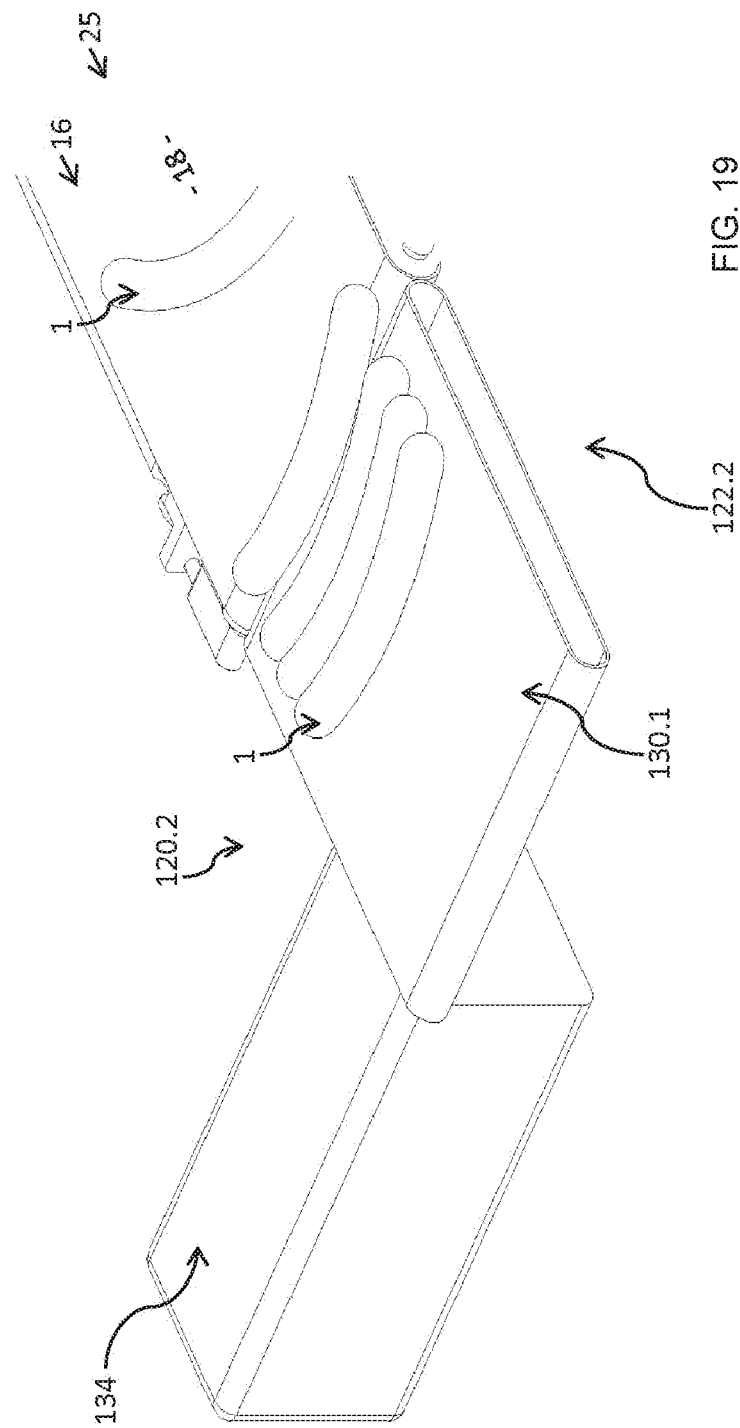
FIG. 19 shows a perspective view of an alternative embodiment of an orientation apparatus similar to the embodiment shown in FIG. 18 but with a smooth endless belt.

FIG. 19 is similar to the embodiment described hereinbefore with reference to FIG. 18 and, in that respect, reference is made fully to the foregoing description and references. The endless belt 130.1 only has no projections 132 respectively forming an abutment, but is substantially flat. By virtue of the fact that there is a gap and/or a difference in height between the conveyor element 18 of the conveyor device 16 and the belt 130.1, for example because the belt 130.1 is arranged somewhat higher than the conveyor element 18, a sausage 1 or a plurality of sausages 3 which are accumulated in the region of the gap would be oriented and possibly grouped. Overall, therefore, this forms a further orientation apparatus 122.2 with abutment device 122.2 which could also be identified as a braking device or stopping device, because it brakes the sausages 1. Alternatively, the endless belt 130.1 could also be operated at a different speed.

FIGS. 20 and 21 show views on an enlarged scale illustrating details of the orientation apparatus 12 shown in FIGS. 5 to 7.

FIG. 22 shows at the right an orientation apparatus 12 as described in detail with reference to FIGS. 5 to 7, together with a downstream-arranged further orientation apparatus 12.3 which has two orientation devices 30.3, 32.3 each having a respective elongate rigid guide 34.3, 36.3, wherein the guides 34.3, 36.3 are so spaced that the spacing is somewhat greater than or is approximately equal to the length of a sausage 1. In other respects, reference is fully made to the foregoing description.

The alternative embodiment shown moreover in FIG. 23 is similar to the embodiment described hereinbefore with reference to FIG. 22 and differs substantially in that an alternative embodiment of an orientation apparatus 12.4 is shown, which instead of guides 30, 32 of the respective orientation device in the form of rails has a plurality of rollers 140 arranged substantially in a row, extending in the conveyor direction. All or only some of the rollers can be driven by motor means, by way of one or more motors and optionally with the interposition of a transmission assembly. The spacing of the two rows of rollers 140 is so selected that it substantially corresponds to the length of a sausage or is slightly greater. In that way, the sausages 1 which are moved lying on the conveyor element 18 in the conveyor direction 25 are oriented by means of the rollers 140 forming the guides 34, 36 so that they are arranged or disposed on the belt 18 approximately transversely relative to the conveyor direction 25, after passing through the guides 34, 36. Alternatively, it would also be possible for the spacing of the guides 30, 32 of the respective orientation device, that are formed by a plurality of rollers 140, to be so selected that it substantially corresponds to the caliber of the sausage 1.

Further Embodiments

1. Apparatus (12) for orienting sausages (1), having at least one conveyor device (16) with a moveable, in particular circulating conveyor element (18) on which individual sausages (1) can be placed and transported in a conveyor direction (25) along a path of movement, characterised by two orientation devices (30, 32) which are spaced from each other transversely relative to the conveyor direction (25) and disposed above the moveable conveyor element (18) and having at least one respective guide (34, 36) for laterally guiding the sausages.

2. Apparatus according to embodiment 1 characterised in that each orientation device (30, 32) respectively has an elongate guide (34, 36) extending in the conveyor direction (25) for the sausages, wherein the guides (34, 36) are disposed in mutually opposite spaced relationship transversely relative to the conveyor direction.

3. Apparatus according to embodiment 1 characterised in that the spacing of the guides (34, 36) of the two orientation devices (30, 32) is adjustable by means of an adjusting device.

4. Apparatus according to embodiment 2 or embodiment 3 characterised in that the length of the guide (34, 36) and the spacing of the mutually opposite guides (34, 36) is variable relative to each other and can be adapted to the lengths of the sausages (1).

5. Apparatus according to one of embodiment 2 to 4 characterised in that the length of a guide (34, 36) approximately corresponds to the length of a sausage (1) and the spacing approximately corresponds to the caliber of a sausage (1).

6. Apparatus according to one of embodiment 2 to 5 characterised in that the guide (34, 36) is in the form of a substantially rigid rail (41, 43) or in the form of a circulating belt (38, 40) extending substantially in the conveyor direction or in the form of a roller track (140).

7. Apparatus according to one of embodiments 2 to 6 characterised in that the mutually opposite guides (34, 36) form a feed region (35) in which the spacing of the mutually opposite guides (34, 36) decreases in the conveyor direction (25) and an orientation region (39) which adjoins the feed region and in which the spacing of the mutually opposite guides (34, 36) remains substantially the same.

8. Apparatus according to embodiment 7 characterised in that the spacing in the orientation region (39) is equal to or somewhat larger than the caliber of the sausages (1) to be oriented.

9. Apparatus according to embodiment 7 characterised in that the spacing of the guides (34, 36) in the orientation region (39) is substantially somewhat larger than the length of the sausages to be oriented.

10. Apparatus according to embodiment 6 characterised in that the guide (34, 36) is a circulating endless belt (38, 40) which is preferably drivable by motor means.

11. Apparatus according to embodiment 6 characterised in that the guide (34, 36) is provided by a plurality of guide rollers (140) having a substantially vertical axis of rotation, wherein preferably a plurality of or all rollers (140) are drivable by motor means.

12. Apparatus according to at least one of preceding embodiments 2 to 11 characterised in that the angle formed between the guides (34, 36) of the two spaced orientation devices (30, 32) is variable at least portion-wise relative to each other.

13. Apparatus according to at least one of the preceding embodiments characterised by a separating device (82) arranged downstream of the orientation devices (30, 32) with respect to the conveyor direction (25) for separating the previously oriented sausages, having a separating element (84) arranged above the conveyor element (18) of a conveyor device (16) and projecting into the path of movement.

14. Apparatus according to embodiment 13 characterised in that the separating element (84) is a separating plate extending in part in the conveyor direction (25).

15. Apparatus according to embodiment 12 and/or embodiment 13 characterised in that the separating device (82) has a front element which enlarges in a wedge shape.

16. Apparatus according to at least one of the preceding embodiments characterised in that the spacing of the guides (34, 36) of the orientation devices (30, 32) is adjustable, preferably by means of at least one screw spindle (66) drivable manually or by motor means.

17. Apparatus according to embodiment 13 characterised in that the separating device (82) is displaceable in its position in the conveyor direction (25) and/or transversely relative to the conveyor direction (25), preferably by means of at least one screw spindle (90) which is drivable manually or by motor means and which cooperates with the separating device (82).

18. Apparatus according to at least one of the preceding embodiments characterised by a device (104) for applying a liquid lubricant to the conveyor element (18) and/or the sausages (1), having at least one discharge nozzle (106) for discharging liquid lubricant on to the conveyor element (18) and/or the sausages (1) and a feed line connectable to a pump for feeding the lubricant to the nozzle (106).

19. Apparatus according to embodiment 18 characterised in that a plurality of liquid discharge nozzles (106) can be supplied with lubricant by means of a feed line and are arranged above the moveable conveyor element (18) at a holding device (110).

20. Apparatus (120) for orienting sausages (1), in particular also according to at least one of the preceding embodiments, having a conveyor device (16) with a moveable, in particular circulating conveyor element (18) on which individual sausages (1) can be placed and transported in a conveyor direction (25) along a path of movement, characterised by an abutment device (122) arranged adjacent to the moveable conveyor element (18) and having an abutment (124) for temporarily stopping one or more sausages (1) on their path of movement, which is moveable into and out of the path of movement of the sausages.

21. Apparatus according to embodiment 20 characterised in that the abutment (124) is in the form of a rail which extends substantially transversely relative to the conveyor direction (25) and which is moveable into and out of the path of movement by means of a guide and drive device in a substantially vertical direction.

22. Apparatus according to embodiment 20 characterised in that the abutment device (122) is in the form of a roller (126) which extends substantially transversely relative to the direction of movement and has a plurality of projections (128) forming abutments, which are rotatable into and out of the path of movement of the sausages (1) by rotation, wherein preferably the roller (126) having the projections (128) is drivable by motor means.

23. Apparatus according to embodiment 20 characterised in that the abutment (124) cooperates with two mutually opposite guides (34, 36) which orient the sausage transversely relative to the conveyor direction.

24. A system (2) for orienting sausages (1) including: an apparatus (12) for orienting sausages according to at least one of preceding embodiments 1 to 19 and an apparatus (12.1, 12.2, 12.3, 12.4) for orienting sausages according to one of embodiments 20 to 23.

25. A system according to embodiment 24 having a first orientation apparatus (12) with two spaced orientation devices (30, 32), and a second orientation apparatus (12.1, 12.2, 12.3, 12.4) which is arranged downstream in the conveyor direction (25) and has two mutually spaced orientation devices (30.1, 32.1), and an apparatus (120, 120.1, 120.2, 122, 122.1, 122.2) for orienting sausages having an abutment (124) for temporarily stopping one or more sausages (1).

26. A system according to one of preceding embodiments 23 to 25 characterised by a packaging machine (14) which follows in the conveyor direction (25) for individually placing sausages (1) in individual packages and for transporting the filled packages away.

27. A system according to one of preceding embodiments 23 to 26 characterised by an upstream-disposed filling machine (4) for producing individual sausages and a separating device (10) for separating joined sausages (1) and for transfer to an orientation apparatus (12, 12.1, 12.2, 120) according to at least one of the preceding embodiments.

28. A method of orienting sausages (1) in which individual sausages (1) are disposed on a moveable, preferably circulating conveyor element (18) of a conveyor device (16), the sausages (1) are transported along a path of movement on the conveyor element (18), the sausages (1) are introduced into an orientation apparatus (12, 12.1, 12.2, 120) between two spaced orientation devices (30, 32, 30.1, 32.1) with a respective guide (34, 36), wherein the spacing of the orientation devices (30, 32, 30.1, 32.1) is so selected that the sausages are oriented substantially in the conveyor direction (25) or transversely relative to the conveyor direction (25).

29. A method according to embodiment 28 characterised in that the length of a guide (34, 36) approximately corresponds to the length of a sausage (1) and the spacing approximately corresponds to the caliber of a sausage (1) and a sausage (1) is transported substantially lengthwise between the guides (34, 36) and elastically deformed there.

29. A method according to embodiment 28 characterised by the feed of the sausages oriented in the conveyor direction to a separating device (82) and thus sorting of the sausages in two groups of sausages with uniformly oriented curvatures.

30. A method according to one of preceding embodiments 28 to 29 in which the sausages are fed to an abutment at which at least one or more sausages are temporarily stopped on their path of movement and then one or more sausages can be further transported and optionally packaged in grouped relationship.

31. A method according to at least one of the preceding embodiments in which the sausages are firstly introduced into a casing by means of a filling machine (4), then twisted off with a twisting-off device (8), then individually separated by means of a separating device (10) and then fed to an orientation apparatus (12), preferably an orientation apparatus (12) according to at least one of the preceding embodiments.

LIST OF REFERENCES

1, 3 sausage
2 system
4 filling machine
6 filling hopper
8 twisting-off device
10 separating device
12 apparatus
12.1, 12.2, 12.3, 12.4
14 packaging machine
16 conveyor device
18 conveyor element
20 rollers
22 frame
25 conveyor device
30, 32 orientation devices
31, 33 rail
34, 36 guide
35 feed region
37 arranged guide
38, 40 extending belt
41, 43 rigid rail
42, 44 direction-changing rollers
43, 45 tensioning rollers
49 orientation region
50, 52 holding element
54, 56 slot
58, 60 fixing screws
62 adjusting devices
64 hand crank
66 screw spindle
68, 70 block
72, 74 bearing block
78, 80 housing
82 separating device
84 separating element
86 adjusting device
88 hand crank
90 screw spindle
92, 94 bearing blocks
96 holding member
98, 100 hand crank
102 front surface
104 device
106 nozzle
108 openings
110 holding device
112, 114 guide element
120, 120.1, 120.2, 120.3 apparatus
122 abutment device
124 abutment
126 roller
127 axis of rotation
128 projections
130 endless belt
132 projections
140 roller (track)

What is claimed is:

1. An apparatus for orienting curved sausages, the apparatus comprising:
at least one conveyor device with a moveable circulating conveyor element on which individual curved sausages can be placed and transported in a conveyor direction along a path of movement; and
a pair of orientation devices which are spaced from each other transversely relative to the conveyor direction and disposed above the moveable conveyor element, wherein each orientation device includes at least one respective guide for laterally guiding sausages,
wherein a spacing of the guides of the pair of orientation devices is so set that the curved sausage is elastically deformed by the spaced guides and in that case at least approximately straightened or bent straight, and
during further transport along the path of movement, a front end of the sausage comes free from the guides of the spaced orientation device while a rear portion of the sausage still remains between the guides, the sausage then after coming free by virtue of the elasticity at least partially again assumes the previously more greatly curved shape and in that case a front portion of the sausage is moved in a direction transversely relative to the conveyor direction and thus at least approximately transversely relative to the path of movement of the sausage.

2. The apparatus of claim 1 further comprising:
an adjusting device configured to adjust the spacing of the guides of the pair of orientation devices.

3. The apparatus of claim 1 wherein each orientation device respectively has an elongate guide extending in the conveyor direction for the sausages, and the elongate guides are disposed in mutually opposite spaced relationship transversely relative to the conveyor direction.

4. The apparatus of claim 3 wherein a length of the guide and the spacing of the elongate guides is variable relative to each other and can be adapted to lengths of the sausages.

5. The apparatus of claim 3 wherein a length of a guide approximately corresponds to a length of a sausage and the spacing of the elongate guides approximately corresponds to a caliber of a sausage.

6. The apparatus of claim 3 wherein the elongate guide is in a form of a substantially rigid rail, in a form of a circulating belt extending substantially in the conveyor direction, or in a form of a roller track.

7. The apparatus of claim 6 wherein the elongate guide is a circulating endless belt which is drivable by motor means.

8. The apparatus of claim 6 wherein the elongate guide is provided by a plurality of guide rollers having a substantially vertical axis of rotation, and a plurality of or all rollers are drivable by a motor.

9. The apparatus of claim 3 wherein the elongate guides form a feed region in which a spacing of the elongate guides decreases in the conveyor direction and an orientation region which adjoins the feed region and in which the spacing of the elongate guides remains substantially the same.

10. The apparatus of claim 9 wherein the spacing of the elongate guides in the orientation region is equal to or somewhat larger than a caliber of the sausages to be oriented.

11. The apparatus of claim 9 wherein the spacing of the elongate guides in the orientation region is substantially somewhat larger than a length of the sausages to be oriented.

12. The apparatus of claim 3 wherein an angle formed between the elongate guides of the pair of spaced orientation devices is variable at least portion-wise relative to each other.

13. The apparatus of claim 1 further comprising:
a separating device arranged downstream of the orientation devices with respect to the conveyor direction for separating the previously oriented sausages, the separating device having a separating element arranged above the conveyor element of a conveyor device and projecting into the path of movement.

14. The apparatus of claim 13 wherein the separating element is a separating plate extending in part in the conveyor direction.

15. The apparatus of claim 13 wherein the separating device has a front element which enlarges in a wedge shape.

16. The apparatus of claim 13 wherein the separating device is displaceable in its position in the conveyor direction and/or transversely relative to the conveyor direction.

17. The apparatus of claim 1 further comprising:
a device for applying a liquid lubricant to the conveyor element and/or the sausages, the device having at least one discharge nozzle for discharging liquid lubricant on to the conveyor element and/or the sausages and a feed line connectable to a pump for feeding the lubricant to the nozzle.

18. The apparatus of claim 17 further comprising:
a holding device; and
a plurality of liquid discharge nozzles supplied with lubricant by the feed line, the plurality of nozzles are arranged above the moveable conveyor element at the holding device.

19. The apparatus of claim 1 wherein the spacing of the guides of the orientation devices is adjustable by at least one manually-drivable screw spindle or by a motor.

20. An apparatus for orienting sausages, the apparatus comprising:
a conveyor device with a moveable circulating conveyor element on which individual sausages can be placed and transported in a conveyor direction along a path of movement; and
an abutment device arranged adjacent to the moveable conveyor element, the abutment device having an abutment for temporarily stopping one or more sausages on their path of movement, which is moveable into and out of the path of movement of the sausages,
wherein the abutment cooperates with a pair of mutually opposite guides which orient the sausage transversely relative to the conveyor direction.

21. The apparatus of claim 20 wherein the abutment is in the form of a rail which extends substantially transversely relative to the conveyor direction and which is moveable into and out of the path of movement by means of a guide and drive device in a substantially vertical direction.

22. The apparatus of claim 20 wherein the abutment device is a roller which extends substantially transversely relative to the direction of movement and has a plurality of projections forming abutments, the abutments are rotatable into and out of the path of movement of the sausages by rotation, and the roller is motor-driven.

23. A system for orienting sausages, the system comprising:
at least one conveyor device with a moveable circulating conveyor element on which individual curved sausages can be placed and transported in a conveyor direction along a path of movement;
an abutment device arranged adjacent to the at least one conveyor element, the abutment device having an abutment for temporarily stopping one or more sausages on their path of movement, which is moveable into and out of the path of movement of the sausages; and
a pair of orientation devices which are spaced from each other transversely relative to the conveyor direction and disposed above the moveable conveyor element, the pair of orientation devices having at least one respective guide for laterally guiding sausages,
wherein the spacing of the guides of the orientation device is so set that the curved sausage is elastically deformed by the spaced lateral guides and in that case at least approximately straightened or bent straight, and
during further transport along the path of movement, a front end of the sausage comes free from the guides of the spaced orientation device while a rear portion of the sausage still remains between the guides, the sausage then after coming free by virtue of the elasticity at least partially again assumes its previously more greatly curved shape and in that case a front portion of the sausage is moved in a direction transversely relative to the conveyor direction and thus at least approximately transversely relative to the path of movement of the sausage,
the abutment cooperates with that at least one guide which orients the sausage transversely relative to the conveyor direction.

24. The system of claim 23 further comprising:
a first orientation apparatus with a pair of spaced orientation devices; and
a second orientation apparatus which is arranged downstream in the conveyor direction and has a pair of mutually spaced orientation devices.

25. The system of claim 23 further comprising:
a packaging machine which follows in the conveyor direction for individually placing sausages in individual packages and for transporting filled packages away.

26. The system of claim 23 further comprising:
an upstream-disposed filling machine for producing individual sausages and a separating device for separating joined sausages and for transfer to an orientation apparatus.

27. A method of orienting curved sausages, the method comprising:
disposing individual curved sausages on a moveable circulating conveyor element of a conveyor device;
transporting the sausages along a path of movement on the conveyor element;
introducing the sausages into an orientation apparatus between a pair of spaced orientation devices with a respective guide, wherein the spacing of the orientation devices is so selected that the curved sausage is elastically deformed by the spaced lateral guides and in that case is at least approximately straightened or bent straight;
further transporting the sausages along the path of movement such that a front end of each sausage comes free from the guides of the spaced orientation devices while a rear portion of each sausage still remains between the guides; and
releasing the sausage by the elasticity at least partially assuming again the previously more greatly curved shape, wherein a front portion of the sausage is moved in a direction transversely relative to the conveyor direction and thus at least approximately transversely relative to the path of movement of the sausage.

28. The method of claim 27 wherein a length of a guide approximately corresponds to a length of a sausage and the spacing approximately corresponds to a caliber of a sausage and a sausage is transported substantially lengthwise between the guides and elastically deformed there.

29. The method of claim 28 wherein the feed of the sausages is oriented in the conveyor direction to a separating device and thus sorting of the sausages in two groups of sausages with uniformly oriented curvatures.

30. The method of claim 27 further comprising:
feeding the sausages to an abutment at which at least one or more sausages are temporarily stopped on their path of movement; and
further transporting and optionally packaging one or more sausages in grouped relationship.

31. The method of claim 27 further comprising:
introducing the sausages into a casing by a filling machine;
twisting off the sausages in the casing with a twisting-off device;
after twisting off the sausages, individually separating the sausages with a separating device; and
feeding the individually separated sausages to an orientation apparatus.

* * * * *